(12) United States Patent
Huang et al.

(10) Patent No.: US 11,314,459 B2
(45) Date of Patent: Apr. 26, 2022

(54) DISTRIBUTED METADATA MANAGEMENT IN A DISTRIBUTED STORAGE SYSTEM

(71) Applicant: Microsoft Technology Licensing, LLC, Redmond, WA (US)

(72) Inventors: Cheng Huang, Redmond, WA (US); Andrew James Edwards, Bellevue, WA (US); Shane K. Mainali, Duvall, WA (US); Aaron William Ogus, Redmond, WA (US); Ioan Oltean, Redmond, WA (US); Huseyin Simitci, Maple Valley, WA (US); Ju Wang, Santa Clara, CA (US); Bradley Gene Calder, Bellevue, WA (US); Yikang Xu, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 244 days.

(21) Appl. No.: 16/811,972

(22) Filed: Mar. 6, 2020

(65) Prior Publication Data
US 2020/0326859 A1 Oct. 15, 2020

Related U.S. Application Data

(63) Continuation of application No. 15/080,465, filed on Mar. 24, 2016, now Pat. No. 10,585,627.

(51) Int. Cl.
*G06F 3/00* (2006.01)
*G06F 9/00* (2006.01)
(Continued)

(52) U.S. Cl.
CPC .............. *G06F 3/067* (2013.01); *G06F 3/064* (2013.01); *G06F 3/0608* (2013.01);
(Continued)

(58) Field of Classification Search
CPC ........ G06F 3/067; G06F 3/0608; G06F 3/064; G06F 9/4401; G06F 9/44505;
(Continued)

(56) References Cited

U.S. PATENT DOCUMENTS

| | | | |
|---|---|---|---|
| 9,798,791 B1 * | 10/2017 | Zhang | G06F 16/178 |
| 2007/0220320 A1 * | 9/2007 | Sen | G06F 11/1456 714/13 |
| 2012/0078844 A1 * | 3/2012 | Kim | G06F 11/1662 707/640 |

\* cited by examiner

*Primary Examiner* — Reginald G Bragdon
*Assistant Examiner* — Michael L Westbrook
(74) *Attorney, Agent, or Firm* — Shook, Hardy & Bacon L.L.P.

(57) ABSTRACT

In various embodiments, methods and systems for implementing a distributed metadata management system in distributed storage systems are provided. A distributed storage system operates based on data storage resources (e.g., extents and streams). The distributed metadata management system is implemented for extent and stream metadata to facilitate the scalability of metadata processing. The distributed storage system implements extent managers and stream managers that independently manage extent and stream metadata, respectively. The extent managers are associated with an extent table that stores extent metadata. The stream managers are associated with streams that store associations with extents. The distributed metadata management system can also utilize a bootstrap layer that leverages components of a legacy distributed storage system to facilitate distributed management of extent and stream metadata. The bootstrap layer is used to store the extent table as a system table and to persist the state of the stream manager as system streams.

20 Claims, 27 Drawing Sheets

(51) Int. Cl.
  *G06F 3/06* (2006.01)
  *G06F 9/445* (2018.01)
  *G06F 9/50* (2006.01)
  *G06F 9/4401* (2018.01)
  *G06F 11/14* (2006.01)
  *G06F 12/02* (2006.01)

(52) U.S. Cl.
  CPC ........ *G06F 9/4401* (2013.01); *G06F 9/44505* (2013.01); *G06F 9/5016* (2013.01); *G06F 11/1458* (2013.01); *G06F 11/1469* (2013.01); *G06F 12/0253* (2013.01)

(58) Field of Classification Search
  CPC ............... G06F 9/5016; G06F 11/1458; G06F 11/1469; G06F 12/0253
  See application file for complete search history.

DISTRIBUTED METADATA MANAGEMENT IN A DISTRIBUTED STORAGE SYSTEM

CROSS-REFERENCE TO RELATED APPLICATION

The present application is a continuation of U.S. application Ser. No. 15/080,465, filed Mar. 24, 2016, and titled "DISTRIBUTED METADATA MANAGEMENT IN A DISTRIBUTED STORAGE SYSTEM" which is incorporated herein by reference in its entirety

BACKGROUND

Distributed computing systems or cloud computing platforms are computing architectures that support network access to a shared pool of configurable computing and storage resources. A distributed computing system can support building, deploying and managing application and services. An increasing number of users and enterprises are moving away from traditional computing architectures to run their applications and services on distributed computing systems. As such, distributed computing systems are faced with the challenge of supporting the increasing number of users and enterprises sharing the same cloud computing resources. Currently, data storage device technology improvements are providing increased number of inexpensive and more robust data storage devices in distributed computing systems. Distributed computing systems can take advantage of growth projections in data storage devices to provide components that support scalability while maintaining high availability and strong consistent storage services. Distributed computing systems can also aim to efficiently operate when utilizing distributed computing resources. In particular, memory usage in a distributed computing system can be optimized based on a memory management system that provides ways to dynamically allocate portions of memory to programs at their request, and free memory (e.g., garbage collection) for reuse when no longer needed. Specifically garbage collection in distributed computing system can improve availability of memory as a resource. Accordingly, the current design and architecture of distributed computing systems can be enhanced to improve scalability for storage and implementing garbage collection in these distributed computing systems.

SUMMARY

Embodiments described herein are directed to methods, systems, and computer storage media for distributed metadata management in distributed storage systems. Data storage device technology improvements are providing an increasing number of data storage devices in the design and architecture of distributed storage systems that process increasing amounts of data and corresponding metadata. A distributed storage system operates based on data storage resources (e.g., extents and streams). A distributed metadata management system is implemented for extent metadata and stream metadata to facilitate the scalability of extent metadata and stream metadata processing at the distributed storage system. In operation, a distributed storage system implements extent managers and stream managers that independently manage extent metadata and stream metadata, respectively. The extent managers are associated with an extent table that stores extent metadata of extents. The stream managers are associated with streams that store associations with extents. The distributed metadata management system can also utilize a bootstrap layer that leverages components of a legacy distributed storage system to facilitate distributed management of extent metadata and stream metadata. The bootstrap layer is used to store the extent table as a system table and the bootstrap layer is also used to persist the state of the stream manager as system streams.

Further, embodiments described herein are directed to methods, systems, and computer storage media for garbage collection in distributed storage systems. The distributed storage system operates based on independent management of metadata. Metadata can specifically be associated with extent and stream data storage resources. A hybrid garbage collection system based on weighted reference counting garbage collection operations and mark-and-sweep garbage collection operations is implemented in the distributed storage system. An extent lifetime table that tracks reference weights and mark sequences for extents is initialized and updated based on indications from extent managers and stream managers, respectively. Upon determining, based on the distributed storage system defined criteria for hand-offs, that an extent is to be handed-off, from weighted reference count garbage collection operations to mark-and-sweep garbage collection operations, a reference weight field for the extent is voided and a mark sequence field of the extent is updated. The mark sequence field of extent in the extent lifetime table is updated with a latest global sequence number. The mark-and-sweep garbage collection operations are now utilized to reclaim the extent when the extent is no longer referenced.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

The present invention is described in detail below with reference to the attached drawing figures, wherein.

DETAILED DESCRIPTION

Data storage device technology improvements are providing increased number of inexpensive and more robust data storage devices in distributed computing systems. And in turn, these advances in data storage devices are translating into changing architecture of cloud computing infrastructure. For example, cloud computing infrastructures now feature and will continue to include hard drives with increased storage capacity, and storage nodes having increased number of hard drives, and storage clusters having increased number of nodes. By way of example, storage capacity can easily increase 10 TB to 100 TB based on projected growths in storage capacity, where, by way of example, the number of hard disk drives (HDD) per storage node can increase from 10+ to 100+ and the number of storage nodes per cluster increase from 100s to 1000s. With this increased storage, current distributed computing system design and architectures are deficient in supporting scalable processing of data in their systems. In particular, a scalable distributed computing system would support a growing amount of work in a capable manner or can enlarge to accommodate growth in the amount of work.

Figure 1:
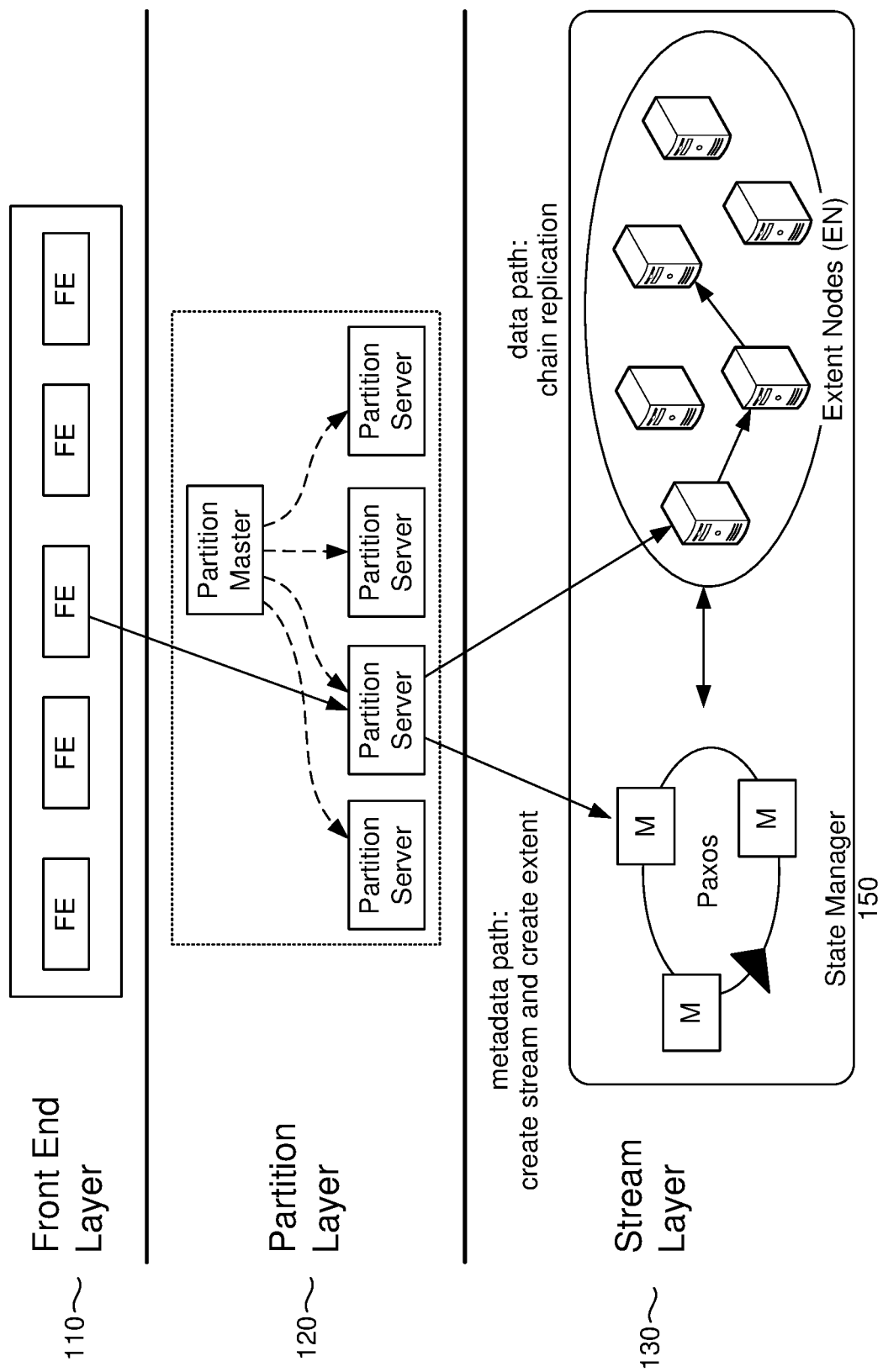
FIG. 1 is a block diagram of an exemplary legacy distributed storage system in which embodiments described herein may be employed.

With reference to FIG. 1, by way of background, a legacy distributed storage system 100 can include components that support the operation of the system. In particular, a front-end layer 110, a partition layer 120, and a stream layer 130, can be components of the legacy distributed storage system 100. A detailed discussion of a suitable architecture of a legacy distributed storage system for performing embodiments described herein is further described in U.S. Pat. No. 8,620,884, filed Oct. 24, 2008, and entitled "SCALABLE BLOB STORAGE INTEGRATED WITH SCALABLE STRUCTURED STORAGE," and Calder, Brad et al., "Windows Azure Storage, A Highly Available Cloud Storage Service with Strong Consistency" SOSP '11 Proceedings of the Twenty-Third ACM Symposium on Operating Systems Principles, 2011: Pages 143-157. Print, which both are incorporated herein, by reference, in their entirety.

In discussions below, the partition layer 120, and the stream layer 130 are referred to as system partition layer and system stream layer, as discussed in more detail below. The system stream layer 130 operates as a distributed file system which manages files called streams and blocks called extents. Streams are ordered lists of extents and extents are large storage chunks. The system stream layer 130 stores data and ensures data durability through replication or erasure coding. The system partition layer 120 operates to store data on top of the stream layer and manages high level abstractions, such as, Blobs, Tables, Queues, and Disks. The legacy distributed storage system 100 can provide a namespace and stores data by partitioning all of the data objects within a storage cluster. The front-end layer 110 can consist of a set of stateless server that take incoming requests.

In operation, the metadata of streams and extents in the system stream layer 130 are maintained by a small cluster of nodes, called a state manager 150 running on a consensus protocol (e.g., Paxos consensus protocol). Stream and extent metadata are hosted in-memory, thus scaling the legacy distributed storage system 100 includes increasing memory capacity for handling the metadata. In addition, scaling would have to account for handling metadata updates which would include reaching a consensus on the execution order of the updates through the consensus protocol and executing the updates and applying changes to in-memory data structures consistently (via state manager 150). The data path in the legacy distributed storage system is based on chain replication and the metadata path in the legacy distributed storage system is to create the streams and the extents, where the metadata of the streams and extents are managed in combination. As such, the legacy distributed storage system's 100 management of metadata presents problems with regard to memory capacity and processing capability when scaling to accommodate the increased workload. The system stream layers, partition layers, and front-end layers in the legacy distributed storage system 100 do not efficiently take advantage of the modern design and architecture of distributed storage systems having new data storage devices.

Embodiments of the present invention provide simple and efficient methods and systems for providing an enhanced distributed storage system that supports distributed metadata management. The enhanced distributed storage system ("distributed storage system") operate components that provide functionality corresponding to components in the legacy distributed storage system, however further operate, as discussed herein, to provide scalable stream and extent management using distributed metadata management. In particular, a distributed metadata management system is provided in the distributed storage to increase the amount of stream and extent metadata that can be processed in the distributed storage system. For example, the distributed storage system can be configured to handle 100× more stream metadata and extent metadata. The distributed storage system implements improved stream metadata and extent metadata processing based on a divide and conquer approach. In operation, at a high level, the distributed storage system separates stream metadata from extent metadata and manages the two types of metadata separately. Secondly, the distributed storage system employs scalable metadata management operations for stream and extents, respectively. The distributed storage system divides both stream and extent metadata into small partitions, which are managed by two main components, a stream manager and extent manager. A large number of stream manager and extent manager instances can be implemented in the distributed storage system.

Figure 2A:
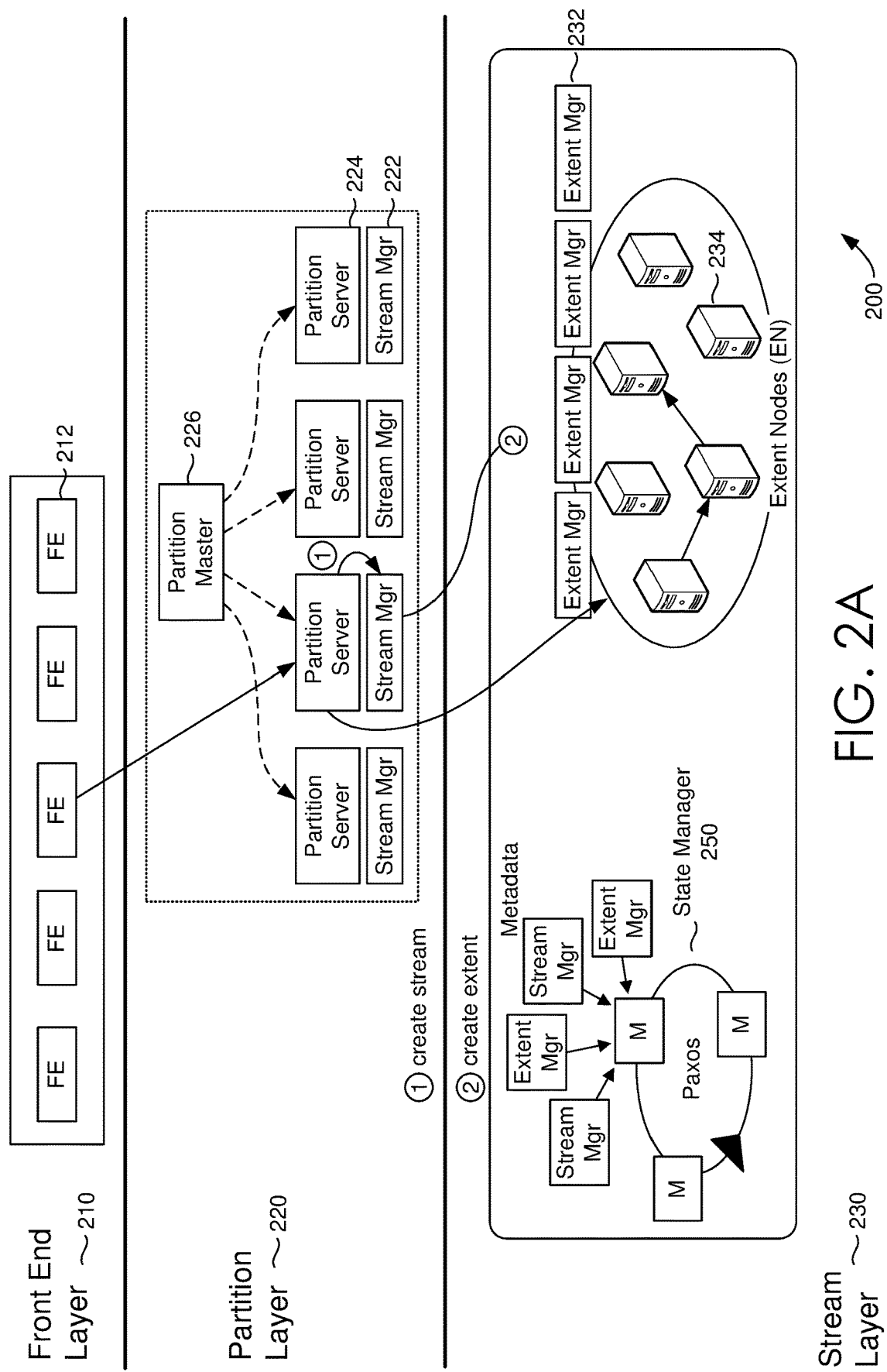
FIGS. 2A and 2B are block diagrams of an exemplary distributed storage system in which embodiments described herein may be employed.

With reference to FIG. 2A, a new stream layer 230 ("distributed metadata stream layer") is implemented to handle the stream metadata and extent metadata for the increased workload. The distributed metadata stream layer 230 is distributed to scale out while maintaining highly availability and strong consistency of the metadata in the distributed storage system. The distributed metadata stream layer 230 operates in a coordinated manner with the partition layer 220. The distributed stream metadata and extent metadata are implemented based on the distributed metadata stream layer 230 imposing system restrictions which impact the partition layer in order to leverage the distributed metadata stream layer 230 efficiently. In this regard, the partition layer 220 can also be optimized to facilitate metadata management in the distributed metadata stream layer 230. The design and architecture includes considerations for both the distributed metadata stream layer 230 and the partition layer 220.

Figure 2B:
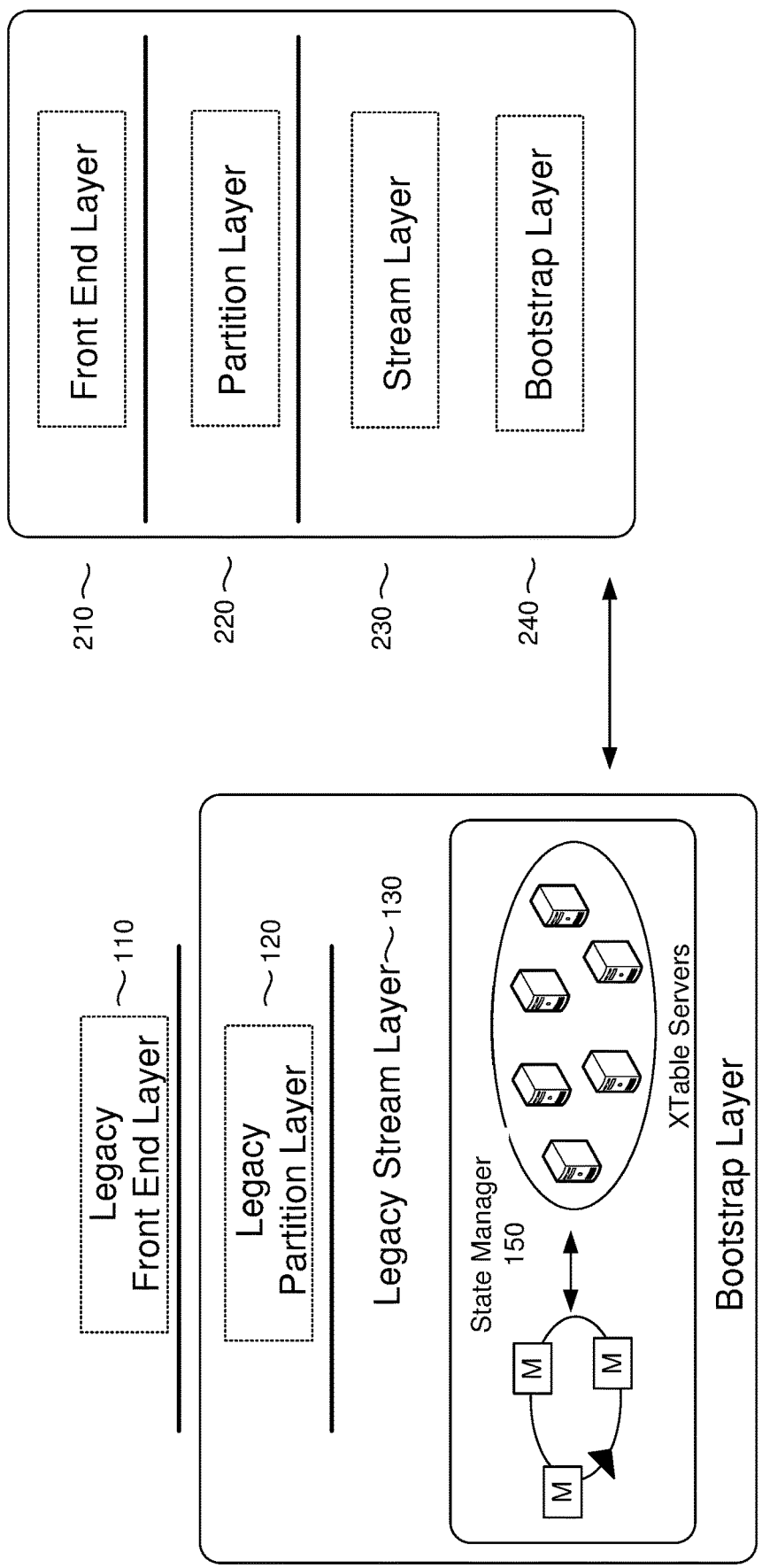

With continued reference to FIG. 2B, advantageously, the distributed storage system 200 includes a bootstrap layer and in particular, a legacy distributed storage system can be leveraged as a component (e.g., a bootstrap layer 240) to support additional functionality of the distributed metadata management system 200. As shown, the distributed metadata management system described herein can be retrofitted with components of a legacy distributed storage system and implemented with the legacy distributed storage system 100.

As such, the distributed storage system 200 can include reused components of the legacy distributed storage system implemented as system stream, system extent, and system table and the distributed storage system 200 components referred to as user stream, user extent and user table.

The distributed metadata management system introduces new challenges with regard to resource management. By way of background, resource management (e.g., memory management) in a distributed storage system generally provides ways to dynamically allocate portions of resources to programs at their request, and more relevant in this case, freeing memory (e.g., garbage collection) for reuse when no longer needed. Garbage collection generally refers to a form of automatic memory management. A garbage collector can reclaim garbage or memory occupied by objects that are no longer in use by a program. Specifically garbage collection in distributed storage systems can improve availability of memory as a resource. Altering the design and architecture of the distributed storage system to support distributed metadata management impacts existing garbage collection functionality.

Garbage collection can be a critical problem for distributed storage systems because manual garbage collection can be error-prone and it is difficult for client to maintain information about references correctly. In an ideal distributed storage system, objects continue to exist as long as they are reachable from clients or root objects and should be reclaimed when unreachable. In practice, this is difficult to support in administratively decentralized large scale distributed computing systems because of the following reasons: distributed objects and references are dynamically created, deleted, migrated, and shared across the network, therefore, it is difficult to determine when an object is not reachable, and whether it is safe to reclaim it; distributed systems are administratively decentralized; distributed systems are very large in scale, so it is impossible to get a global view of clients, objects and their references; servers and clients can crash during garbage collection related operations; and messages can be lost, and the network can be partitioned for a while.

Accordingly, embodiments of the present invention further provide simple and efficient methods and systems for providing garbage collection in a distributed storage system, and in particular, a distributed storage system implementing distributed metadata management. At a high level, garbage collection is implemented based on a hybrid garbage collection system comprising reference counting and mark-and-sweep operations ("hybrid garbage collection system". The hybrid garbage collection system operates with at least a first set of extents (reference counting extents) keeping track of reference weights and are managed by weighted reference counting, while at least a second set of extents (mark-and-sweep extents) are marked with global sequence numbers and managed by mark-and-sweep. The hybrid garbage collection system allows handing-off extents, based on predefined hand-off criteria for the distributed storage system, from reference counting to mark-and-sweep, as discussed in more detail herein.

Figure 3:
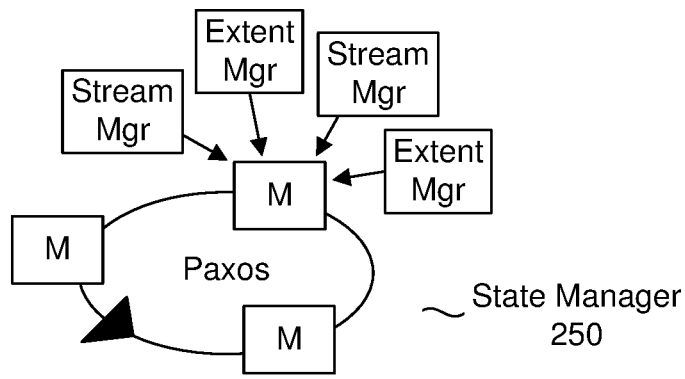
FIG. 3 is an exemplary state manager for implementing distributed metadata management in distributed storage systems, in accordance with embodiments described herein.

With continued reference to FIG. 2A, an exemplary distributed storage system 200, for implementing a distributed metadata management is provided. The distributed storage system 200 can include a front-end (FE) layer 210 having front end-servers (e.g., front server 212); a partition layer 220 having a partition master 226, partition servers (e.g., partition server 224) and stream managers (e.g., stream manager 222); and a stream layer 230 having extent nodes (ENs) (e.g., EN 234); extent managers (e.g., extent manager 232). The stream layer can include a state manager 250 for distributed management of stream and extent metadata. With reference to FIG. 3, an exemplary state manager 250 for implementing distributed metadata management is illustrated. In some embodiments, the state manager 250 can be implemented based on a legacy distributed storage system (e.g., state manager 150) operating with the stream layer 230. Extents and streams can be partitioned and managed by many distributed extent managers and stream managers. The partition layer 220 can use the extent managers and stream managers to create user extents and user streams, for persisting customer data. An extent manager and stream manager can persist their own data in legacy distributed storage system 100 system extents and system streams. System extents and system streams are managed by the state manager 150. The state manager 250 (or a bootstrap layer state manager 150) operates with extent managers and stream managers to manage system extents and systems streams.

Figure 4:
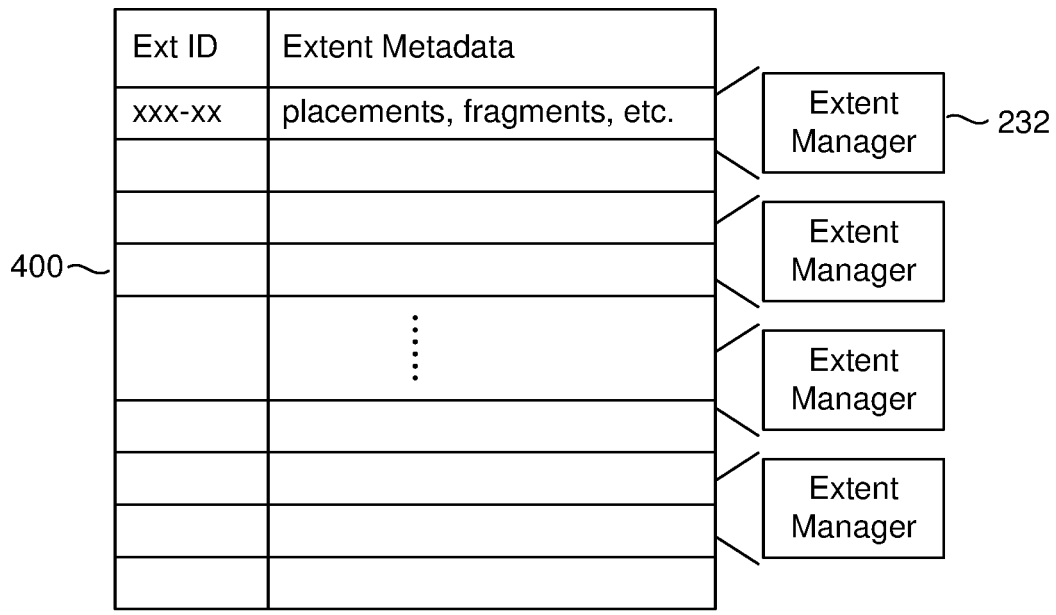
FIG. 4 is an exemplary extent table for implementing distributed metadata management in distributed storage systems, in accordance with embodiments described herein.

Distributed storage system 200 extent management can be performed using several different data structures and components. With reference to FIG. 4, the extent metadata contains extent-related information in the extent table 400. By way of example, extent information, as shown can include a unique extent ID, a list of which Extent Nodes (EN) different replicas of extents are stored, the length and checksum of each replica, timestamps (e.g., creation and last modified times) and flags (e.g., whether an extend is opened or sealed, whether the extent is replicated or erasure coded). Extent metadata is compacted for a replicated extent. For redundancy and high availability purposes there are replicas for each extent. For discussion purposes, an exemplary implementation includes three replicas for each extent. For an erasure coded extent, the metadata can be substantially inflated as the extent is further divided many fragments. In addition to a much longer list of host ENs, the metadata also contains a much longer list of checksums and lengths for the fragments. As the amount of data to be stored and corresponding metadata increase, size attributes for extent have to be defined. For example, a target extent metadata can be defined as 1 KB. So for illustration purposes, a target size for a scalable distributed storage system may be set to 1000 nodes per storage cluster with 100 HDD per nodes at 100 TB per HDD. With an extent size of 1 GB, this is equivalent to $10^{10}$ (or 10 billion) extents and the total amount of extent metadata is 10 TB.

Figure 5:
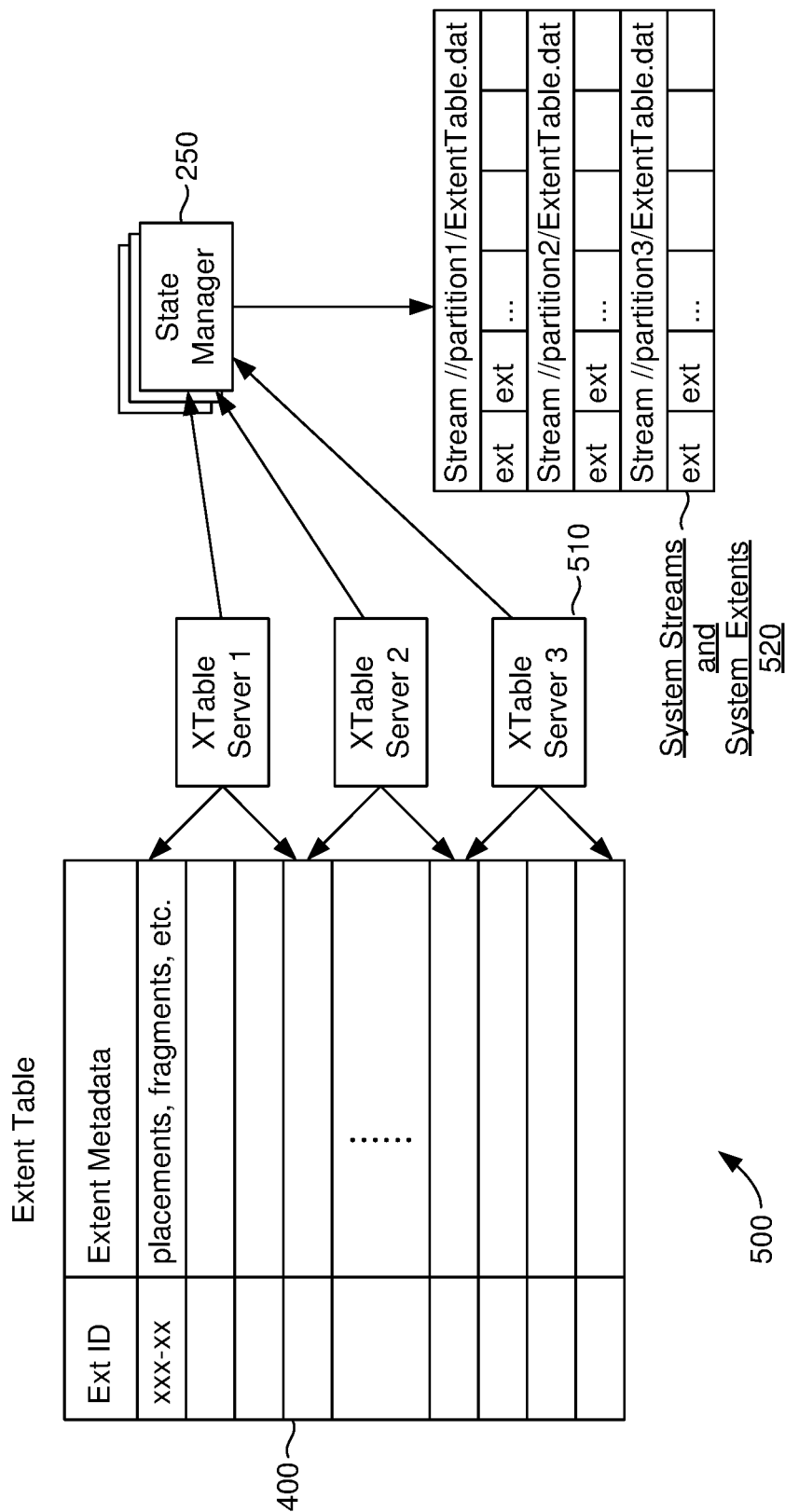
FIG. 5 is an exemplary state manager operating environment for implementing distributed metadata management in distributed storage systems, in accordance with embodiments described herein.

With reference to FIG. 5, an exemplary state manager operating environment 500 for implementing distributed metadata management is illustrated. The distributed storage system 200 manages extent metadata in a table called the extent table (e.g., extent table 400). The extent table can be stored in a bootstrap layer (e.g., bootstrap layer 240). The extent table can be a stored using Xtable servers (e.g., Xtable server 510) and system table in the legacy distributed storage system 100. The extent table can be persisted using system streams and system extents (e.g., system streams and system extents 520). The metadata of the system streams and systems extents are managed by the state manager 250. By way of example, the system extents are can be configured to have a capped size (e.g., 64 MB). As such, an extent table of 10 TB would have about 164K system extents and thousands of system streams. The memory footprint and update rate for the system extents and streams can be managed using the state manager 250. The system extents can be 3-way replicated and store on SSDs (solid state drives). So, the extent table of 10 TB in the 1000-node storage cluster would have 3*10=30 GB SSD space per node.

The extent table can be partitioned by extent ID and managed by extent managers. Extent managers are responsible for metadata for a contiguous range of extents. Extent managers can be implemented to not overlap in their range but collectively cover the entire extent ID space. The assignment of ranges to extent managers may be done by an extent master (not shown). Extent managers may be implemented as a centralized component with multiple instances for high availability. For discussion purposes, 10,000 extent managers can be implemented in the 1000-node storage cluster. In this regard, 10 extent managers can be implemented for each node. Extent managers host in memory full metadata for extents with the extent manager's corresponding range. An extent manager can implement 1 GB memory and 10 GB in total for 10 extent managers per node. The memory footprint can support the growing hardware in distributed storage system infrastructures. It is contemplated that, if needed, memory optimization can be implemented, such as tiering metadata to SSD based on access frequency difference at various part of the metadata, however, to reduce memory footprint.

Conventionally, in a legacy distributed storage system 100, the state manager 150 is responsible for operations that update the extent metadata. In the distributed storage system 200, extent managers implement update operations for extent metadata. Extent managers can be responsible for extent creation and deletion. The extent managers monitor the health of extent nodes (ENs) and synchronize extent metadata with the ENs. When extents become sealed and suitable for erasure coding, extent manager can be responsible for scheduling them to be erasure coded. Upon completion of erasure coding, extent manager can delete original extents from the ENs. Upon EN failures, extent managers operate to identify extents that are missing replicas or fragments (in the cases where extents are erasure coded) and schedule re-replication or erasure coding recovery. Extent managers can further monitor the load capacity across the ENs and perform load balancing by migrating extents and fragments.

In the legacy distributed storage system 100, metadata updates are persisted in the consensus logs in the state manager 150. The distributed storage system 200, metadata updates are persisted in extent tables. Extent tables are updated using extent managers. Extent manager can be configured with exclusive ranges of extent IDs in order to obviate conflicts in updating extent metadata. In operation, for extent creation, an extent manager sends an extent creation message to three ENs. Each EN creates the extent locally and sends an acknowledgement to the extent manager. The extent manager then inserts a new row into the extent table with extent ID and the corresponding metadata. If the extent manager crashes and re-launches in the middle of this extent creation process, the creation of the extent is either lost or stalled. Nonetheless, the scenario is acceptable to external components (e.g., upper layers). When external components want to create a new extent, they invoke two or more extent managers simultaneously for extent creation. Each manager picks at random a unique extent ID within it range and creates the extent. As long as one extent succeeds, the external components successfully get the newly created extent. When both extent managers succeed, the one with few extents wins and the other saves its newly created extent for future extent creation. Therefore, invoking two extent managers for extent creation advantageously supports accommodating temporary extent manager unavailability and load balancing storage capacity across extent managers. Other metadata update operations function based on the same principle, as such, it is acceptable for extent managers the operations to be lost or stalled when the extent manager crashes and re-launches.

Extent metadata resolution generally refers to schemes for accessing metadata associated with extents nodes. For example, given an extent ID, there exist two paths to obtain the extent metadata. A first path can include querying the extent manager in charge of the extent. Because the extent managers host the metadata in memory, the query can be completed in a timely fashion. Clients querying the extent manager for extents access or download from the extent master a mapping between extent ID ranges and extent managers.

A second path for accessing metadata can be implemented when an extent manager is unavailable. The extent manager can be implemented as a single instance. If a hosting node of the extent manager is unavailable, the extent manager is also unavailable. The extent master can monitor the health of extent managers and re-launch the extent manager on another node when the extent manager becomes unavailable. However, during the interim period when the node is unavailable, the extent manager remains unavailable. In this case, the extent metadata can be alternatively obtained by query the extent table directly. As discussed, the extent table is a system table in a bootstrap layer 240 and provides a key-value interface where the extent ID is the key and the metadata is the value.

The distributed storage system 200 offers two paths for metadata resolution in order to boost metadata availability. By way of example, given an extent ID range, let $p_e$ and $p_t$ be the unavailability of the extent manager and the partition server, which is serving extent Table in the bootstrap layer. Then, the availability of the given extent range is $(1-p_t*p_e)$. The entire metadata is available when every range is available. So, its availability is calculated as $(1-p_e*p_t)^N$, where N is the number of extent managers and partition servers. When N=10,000 and both extent manager and partition server are controlled to be unavailable less than 30 seconds per day, the availability of the entire metadata is as high as three 9s.

In a legacy distributed storage system 100 an extent is sealed upon reaching a defined size or upon failure. Sealing an extent involves updating the length and flag in the extent metadata. The distributed storage system 200 supports two types of sealing operations—a normal sealing operation and a failure sealing operation. When all three ENs storing the extent are healthy, normal sealing involves writing a sealing record through the chain-replication protocol. Once the sealing record is successfully written, all three replicas of the extent are sealed with an identical length, called sealed length. The sealing process completes quickly and does not involve the extent manager. The extent manager can lazily learn about the sealed length and flag through periodic synchronization with the ENs. The extent manager can update the extent table whenever the extent manager learns the new extent metadata information from the ENs. In a scenario where at least one EN fails, a failure sealing operation is triggered. Failure sealing is a time-critical metadata operation, in contrast to some other update metadata operations. Failure sealing operation can be performed in two main ways—failure sealing through state manager and failure sealing through shadow replicas.

Failure sealing through the state manager is based on the state manager polling the lengths from all the ENs. The state manager decides the shortest length as the sealed length and persists the sealed length in the consensus logs. Once the sealed length is persisted, the state manager updates the extent manager in charge of the extent. The extent table, however, may not be updated until a later time when the ENs synchronize with the extent manager. The configuration can be a deliberate one to ensure that updating extent table is not on a critical path of failure sealing. As such, the state manager can keep the sealed length until all three replicas have become identical and the sealed length is reflected in the extent table. Then, the state manager may drop the sealed length anytime. The state manager keeps the sealed length for only a short period of time. In contrast, in a legacy distributed storage system 100, the sealed length may be permanently stored in the state manager.

The sealed length is critical for reads to reach the end of the extent correctly. For such reads, the distributed storage system 200 includes a read API, called ReadAsSealed. When an EN receives a call of a ReadAsSealed, the EN determines whether the extent has already been sealed. If the extent has been sealed, the EN reads data normally. However, if the extent is unsealed, the EN contacts the state manager 150. A scenario exists where the extent is in fact sealed, but the EN is unaware because the EN missed the sealing process. In this case, the state manager 150 is guaranteed to have the sealed length because having a sealed length implies that the state manager participated in sealing and had the sealed length and the EN having an unsealed replica implies that all three replicas are not identical yet so the state manager 150 must not have dropped the sealed length. As such, the ReadAsSealed can obtain the sealed length from state manager 150 and reach the end of the extent correctly.

Figure 6A:
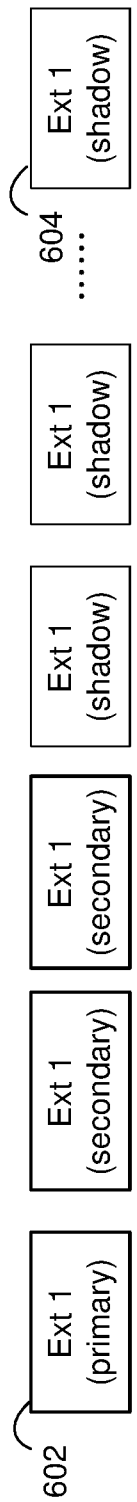
FIGS. 6A and 6B are schematics of operations in a partition layer and stream layer for implementing distributed metadata management in distributed storage systems, in accordance with embodiments described herein.

Failure sealing through shadow replicas spreads the failure sealing load across all storage nodes to improve scalability. Shadow replicas can be part of the extent creation operation. Each extent can be implemented using three real replicas and m shadow replicas, making a total of n=m+3 replicas. Each shadow replica is assigned an EN and the list of ENs for the shadow replicas are recorded in the extent metadata in the extent table. With reference to FIG. 6A, different from real replicas (e.g., Ext 1 (primary) 602), the shadow replicas (e.g., Ext 1 (shadow) 604) are imaginary or fictional in that the shadow replicas are not physically or actually created in the ENs. This means that the ENs are unaware of the existence of the shadow replicas. Shadow replicas can be discussed in this regard as replicas that are virtually created.

Upon detecting a failed EN and initiating failure sealing based on shadow replicas, the ENs for both the real replicas and the shadow replicas participate in deciding a sealed length. The ENs run a consensus protocol (e.g., PAXOS protocol) among themselves to reach an agreement on the length. The shadow replicas record locally nothing but voting decision and the final outcome. When an EN receives a call of ReadAsSealed, if it has an unsealed replica of the extent, the EN runs the same Paxos protocol. If the extent has not been sealed yet, the Paxos voting process will reach an agreement on a sealed length. Otherwise, the process is guaranteed to discover the already agreed sealed length. This approach is viable as long as simultaneous EN failures are no more than half (including ones for both the real and shadow replicas), the Paxos protocol guarantees an agreement and the agreed sealed length will not change. In operation, the shadow replicas introduce limited overhead, for example, other than small addition in the extent metadata, there is very little cost having as many shadow replicas as needed. In an exemplary implementation 8 shadow replicas can be used on ENs. With a total of 11 replicas, an agreement on sealed length can be reached even when there are up to 5 simultaneous EN failures.

Figure 6B:
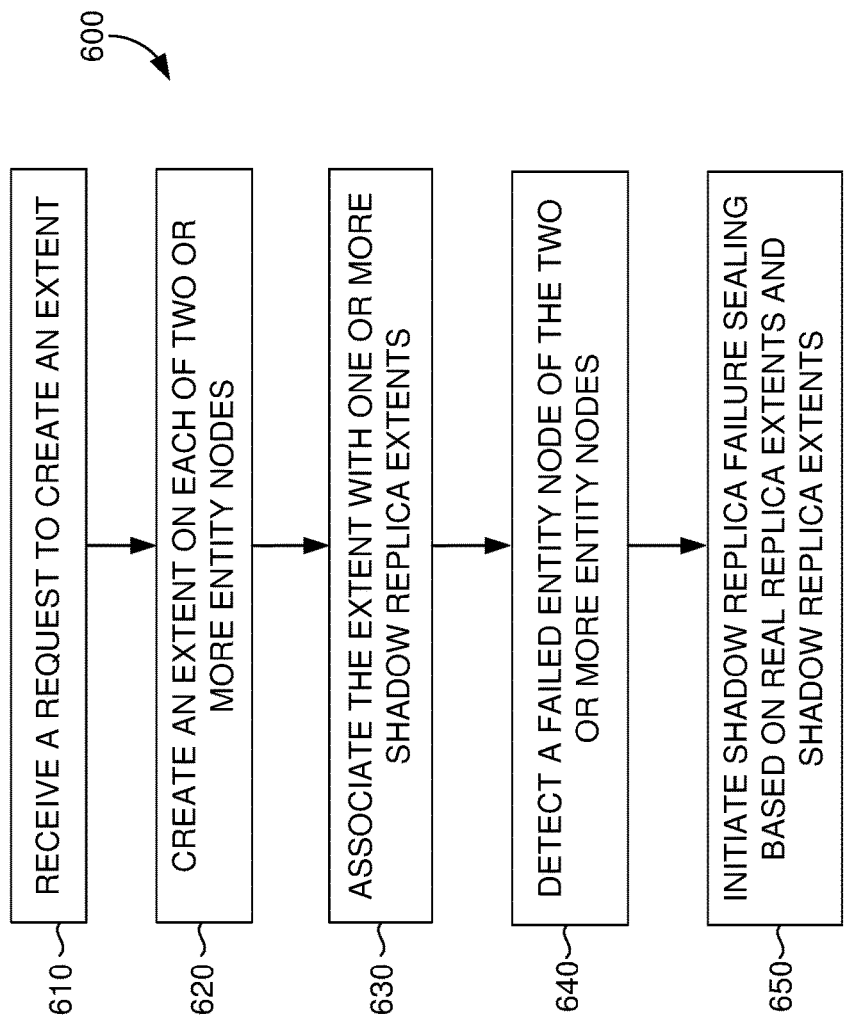

With reference to FIG. 6B a flow diagram that illustrates an exemplary method 600 for implementing failure sealing with shadow replica extents in a distributed metadata managed distributed storage system, is provided. Initially at block 610, a request is received to create an extent. Creating an extent is based on operations in the distributed storage system as described herein. At block 620, an extent is created in each of two or more entity nodes. The extents in the two or more entity nodes are real replica extents. At block 630, the extent requested to be created is associated with one or more shadow replica extents. A shadow replica extent is virtually created. Creating the shadow replica extent includes assigning the shadow replica extent an entity node. The entity nodes of the shadow replica extents are unaware of the existence of the show replica extents. As such, there exists limited overhead in maintaining one or more shadow replica extents for real replica extents. The entity nodes having shadow replica extents are recorded in an extent table. The list of entity nodes is recorded in extent metadata of the extent table. At block 640, a failed entity node of the two or more entity nodes is detected. At block 650, shadow replica failure sealing is initiated. In embodiments, a determination is first made whether failure sealing is performed using a state manager or shadow replicas. Shadow replica failure sealing includes sealing the extent based on a determined seal length, where determining a sealed length is based on both real replica extents and show replica extents.

Determining the sealed length based on both real replica extents and shadow replica extents, further comprises, the real replica extents and the shadow replica extents running a consensus protocol between each other to determine the sealed length. The shadow replica extents can record voting decisions and final outcomes for the sealed length locally on their corresponding entity nodes. It is contemplated that the shadow replica extents are excluded from locally recording any information that is not related to the voting decisions and final outcomes for the sealed length. Shadow replica extents increase the capacity for real replica extents and shadow replica extents to reach an agreement on a sealed length during entity node failures. In other words, with shadow replicas, sealing process can reach consensus among the extents themselves and therefore complete, even in the event of entity node failures. This is not possible with entity nodes alone.

The sealed length is critical for reads to reach the end of a corresponding extent correctly. Reads to the extent associated with the sealed length is performed using a read Application Programming Interface (API) that operates with a given entity node. The given entity nodes utilizes the read API to determine whether the extent has already been sealed such that when the extent has been sealed, the given entity node reads the extent associated with the sealed length normally. Further, reads to the extent associated with the sealed length is also performed using the read Application Programming Interface (API) that operates with a given entity node. The given entity node utilizes the read API to determine whether the extent has already been sealed such that when the extent has not been sealed, the given entity node runs a consensus protocol to reach an agreement on a sealed length.

Figure 7:
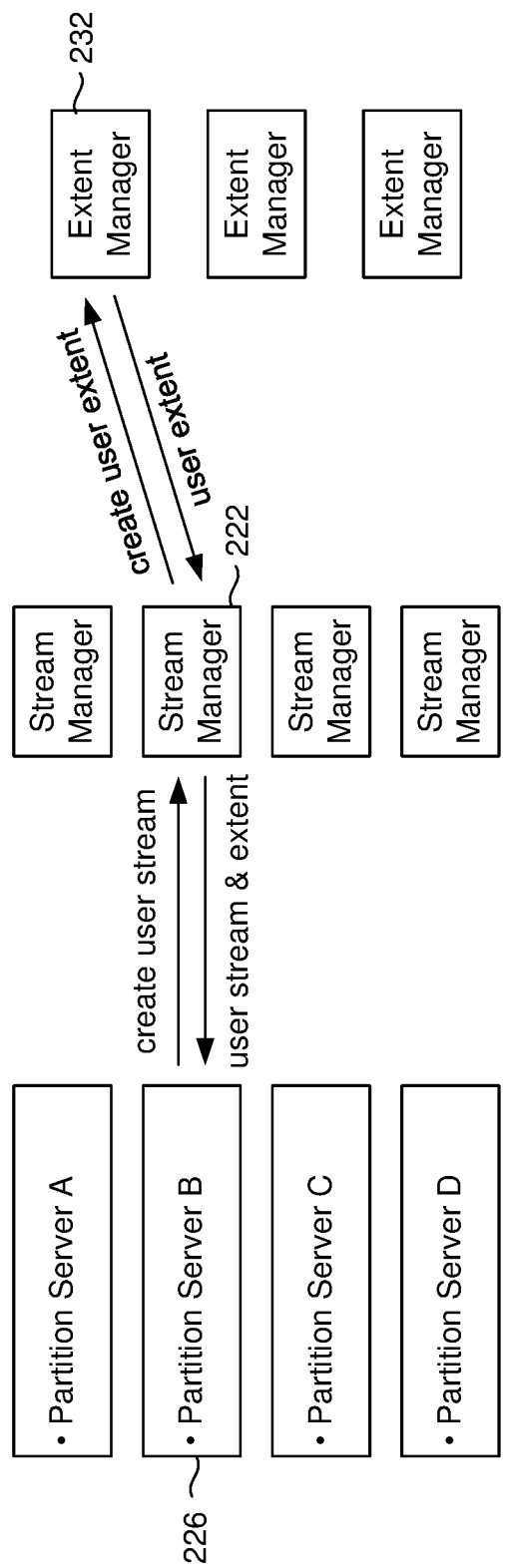
FIG. 7 is a schematic of operations in a partition layer and stream layer for implementing distributed metadata management in distributed storage systems, in accordance with embodiments described herein.
Figure 8:
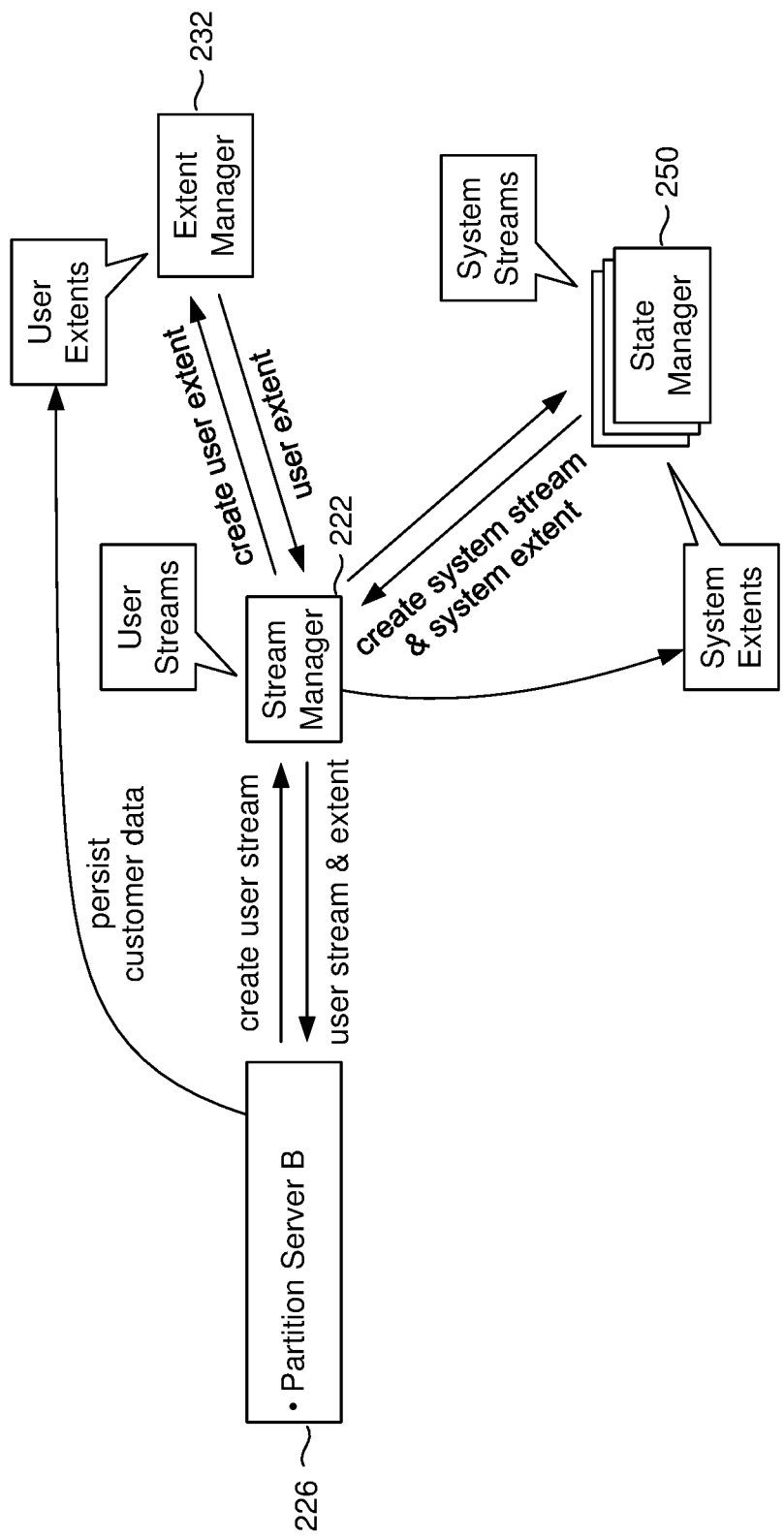
FIG. 8 is a schematic of operations in a partition layer and stream layer for implementing distributed metadata man

With reference to FIGS. 7 and 8, schematics 700 and 800 of operations in a partition layer and stream layer for implementing distributed metadata management in distributed storage systems are illustrated. User streams (or simply streams) in the distributed storage system 200 are used by the partition layer 220. Each table partition in a partition layer can create a corresponding set of streams, such as metadata stream, commit log stream, raw data stream and blob data stream, etc. As such, the distributed storage system 200 may partition stream management along the boundary of table partition. Each stream partition can be managed by a stream manager. In embodiment, a stream manager and a table partition have a 1:1 relationship. The stream manager can perform stream manager operations based on two data structures: stream and collection. A stream can be defined in two variations or objects (e.g., stream object or collection object. A stream comprises an ordered list of extents, or a collection comprising an unordered set of extents. Extents can be represented using their unique IDs in stream manager, which may optionally cache the metadata of the extents.

Figure 9:
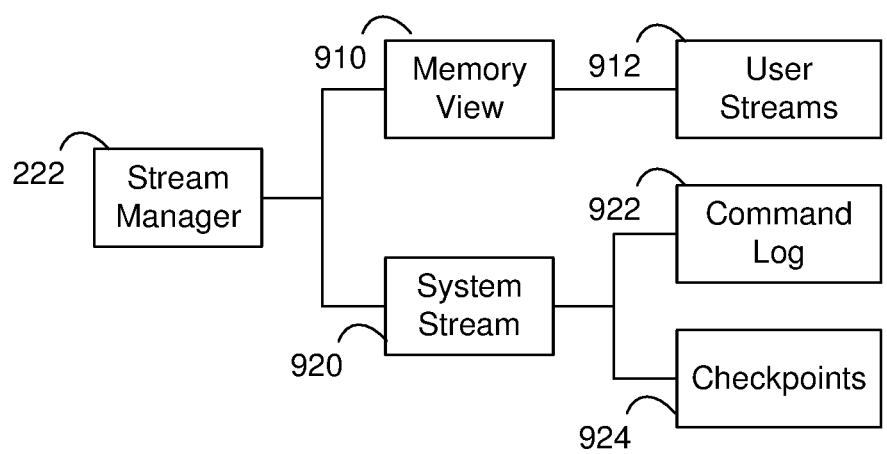
- FIG. 9 is an exemplary stream manager for implementing distributed metadata management in distributed storage systems, in accordance with embodiments described herein; in accordance with embodiments described herein.

In operation, a partition server (e.g., partition server B 226) can communicate a request to create a user stream to a stream manager (e.g., stream manager 222). The stream manager communicates with an extent manager (e.g., extent manager 232) and extent nodes to create a user extent, as discussed herein. The user extent can be communicated to the stream manager from the extent manager and the user stream and user extent can be communicated to the partition server from the stream manager. As shown in FIG. 9, the stream manager can operate with in-memory metadata (e.g., memory view 910) and system streams (e.g., system stream 920). The in-memory metadata can include user streams (e.g., user streams 912) containing streams and extents used by a partition server for persisting customer data. The systems streams can include command logs (e.g., command log 922) and checkpoints (e.g., checkpoints 924) containing operations on stream manager persisted in the system stream.

The partition server can persist customer data as user extents managed using the extent manager. The stream manager can persist the stream manager state using system streams in the bootstrap layer. More specifically, the stream manager can operate via the state manager 250 to create two system streams: a command log stream and a checkpoint stream. The command log stream records in a log-structured fashion external update commands occurred at the stream manager, such as creating a stream or collection, adding an extent into a stream and removing an extent from a collection, etc. External update commands can be first recorded in the command log stream and then executed to modify in the memory state of the stream manager. Because the system streams are durable through replication, the stream manager can survive failures. After a crash, the stream manager re-launches by replaying the commands in the command log stream and recovering itself to the latest state. The checkpoint stream is a standard technique, where keeping snapshots of the stream manager helps to avoid replaying the entire history of commands and in turn accelerate re-launch.

A table partition invokes a stream manager to create and modify streams and collections. The table partition also invokes the stream manager to create extents, where the stream manager internally invokes two or more extent managers for extent creation, as previously described herein. The table partition is responsible for adding and removing extents from streams and collections.

Embodiments described herein can be implemented with an interface for table partitioning. As previously discussed, stream manager provides two abstractions or data structures to a table partition: stream and collection. Adding and removing extents from streams is explicit, where the table partition invokes stream manager directly. Adding extents to a collection is similar. Removing extent from a collection, however, is implicit and works differently. The table partition periodically submits a list of extents it is referencing and invokes stream manager to mark them with the latest global sequence number. This design matches table partition local garbage collection logic with the global mark-and-sweep process as discussed herein in more detail. It also simplifies the collection abstraction in the stream manager because only those extents managed by reference counting are tracked and the rest of the extents which are managed by mark-and-sweep are ignored by the collection.

The distributed storage system 200 may operate in three operating modes depending a management approach selected for extents and streams. The distributed storage system 200, can implement two types of extents (user extents vs. system extents) and two types of streams (user streams vs. system streams). The distributed storage system 200 can be implemented in a first mode using distributed extent management and distributed stream management, in a second mode using distributed extent management and centralized stream management, and in a third mode using centralized extent management and distributed stream management.

In the first mode, distributed extent management and distributed stream management, a state manager manages all system extents and streams. Distributed extent managers handle all user extents, while distributed stream managers handle all user streams. The second mode, distributed extent management and centralized stream management, is a simplified mode. In addition to all system extents and system streams, the state manager also manages all user streams. The only ones that state manager does not manage are user extents, which are handled by distributed extent managers. This mode operates without distributed stream managers, by keeping all stream management centralized at the state manager. The third mode, centralized extent management and distributed stream management, is another simplified mode. In addition to all system extents and system streams, the state manager also manages all user extents. The only ones that state manager does not manage are user streams, which are handled by distributed streams managers. This mode operates without distributed extent managers, by keeping all extent management centralized at state manager. The flexibility in operating modes is advantageous in the distributed storage system 200 development, as it allows for independent development and testing in the distributed extent management and stream management. After individual operating modes are fully tested, individual modes can therefore be integrated together to realize the complete distributed storage system 200.

Figure 10:
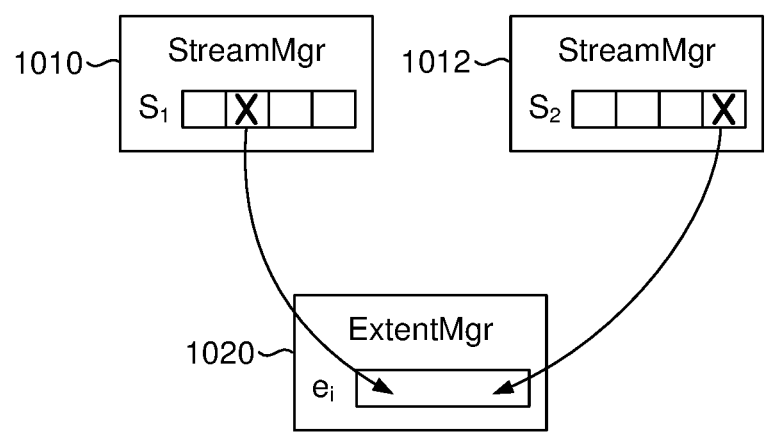
FIG. 10 is a schematic of multiple stream managers referencing an extent, in accordance with embodiments described herein.

With reference to garbage collection functionality, the distributed storage system 200 operates based on managing the stream and extent metadata separately as discussed above. Separating the management of stream and extent metadata presents challenges in the extent lifetime management, particularly because a single extent can be referenced by different streams across multiple stream managers. With reference to FIG. 10, multiple references to the same extents are common in two scenarios: blob copy and partition split. When a blob is copied from one URL to another, data is not physically copied. Instead, a new reference to the extent storing the data is added to the destination stream manager. When one table partition splits into two, the table partition stream manager also splits into two, one for each new table partition. The extents referenced by the original stream manager will now be shared and referenced simultaneously by the two new stream managers (e.g., StreamMgr 1010, and StreamMgr 1012 both reference $e_i$ in ExtentMgr 1020). The $e_i$ is safe to be reclaimed when both $S_1$ and $S_2$ un-reference $e_i$.

Each stream manager can operate to independently manage its extent reference. Once all stream managers remove their references, an extent becomes orphan and should be reclaimed. However, because stream managers and extent managers run on different nodes in the storage cluster, extent lifetime management presents a challenging problem of distributed garbage collection and requires efficient solutions. As such, embodiments of the present disclosure further provide approaches for extent lifetime management.

Figure 11:
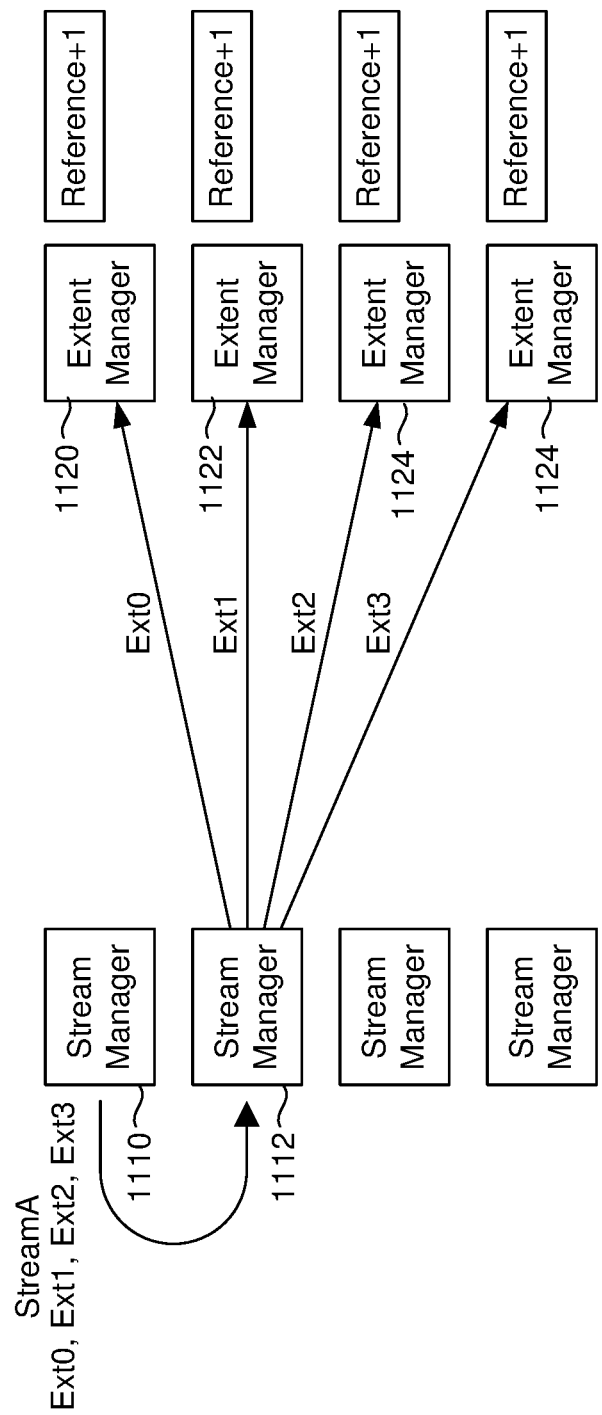
FIG. 11 is a schematic of copying streams with referencing counting, in accordance with embodiments described herein.

By way of background, reference counting refers to mechanism for distributed garbage collection. Conceivably, an extent manager can maintain a reference count for every extent. Whenever the stream manager adds (or removes) an extent to its stream or collection, it invokes an extent manager to increase (or decrease) the reference count. As soon as the reference count drops to 0, the extent can be reclaimed. However, applying reference counting in the distributed storage system 200 can be problematic. By way of example, a stream manager can refer to 1,000 extents. When the stream manager splits into two, both new stream managers need to have references to all the 1,000 extents. As such, each of the 1,000 extents has to increase its reference count. Since extents are partitioned by ID, it becomes likely that the 1,000 extents belong to 1,000 different extent managers. Hence, a simple partition split requires communication with 1,000 extent managers in order to increase the 1,000 extent reference counts. Also with reference to FIG. 11, copying extents rules in many reference count updates. For example, stream manager 1110 can include stream A having extents (e.g., Ext0, Ext1, Ext2, Ext3) that are copied to stream manager 1112. Stream manager 1112 communicates with each extent manager of the extents (e.g., extent managers 1120, 1122, 1124 and 1126) to increase the reference count. Accordingly, this results in an inefficient solution during splitting and copying.

Figure 12:
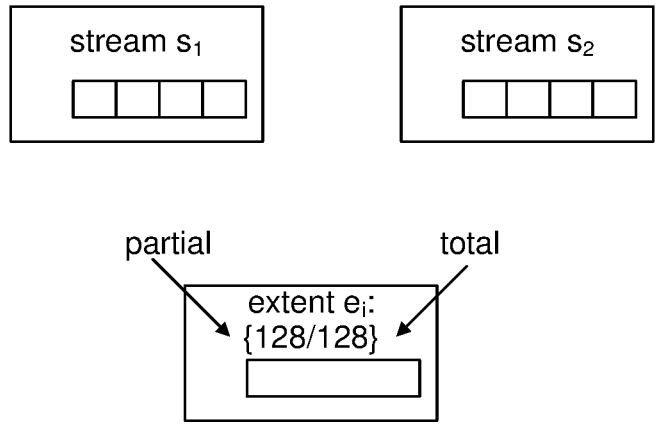
FIG. 12 is a schematic for implementing weighted reference counting, in accordance with embodiments described herein.
Figure 13:
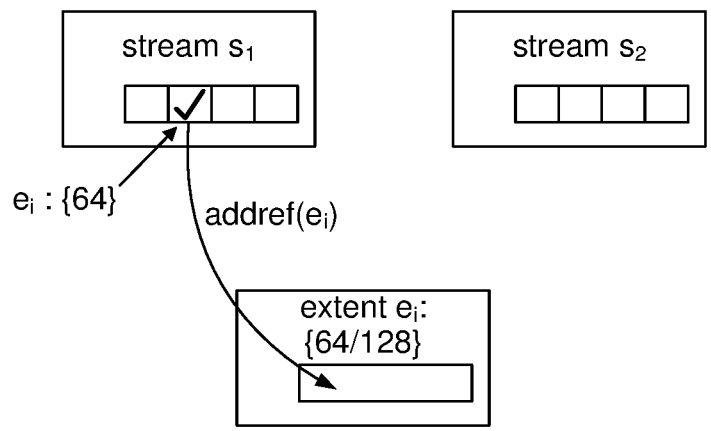
FIG. 13 is a schematic for implementing weighted reference counting, in accordance with embodiments described herein.
Figure 14:
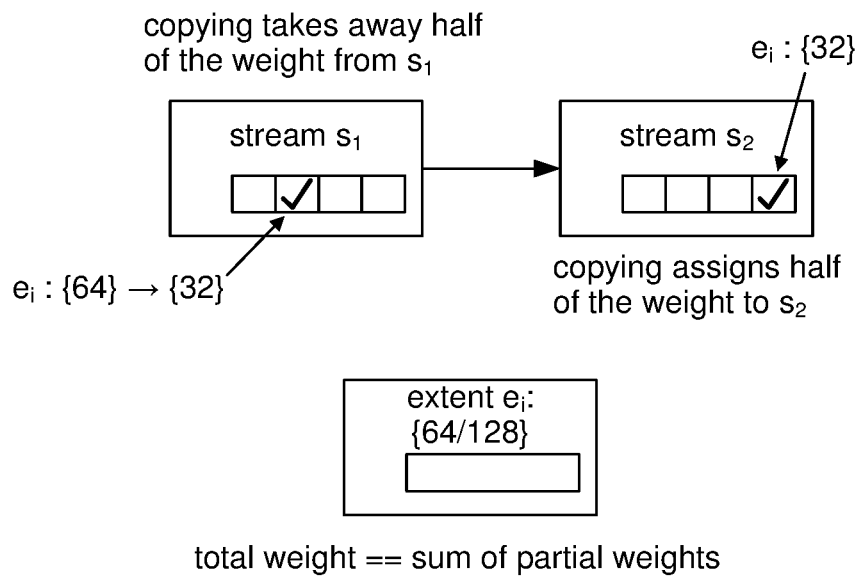
FIG. 14 is a schematic for implementing weighted reference counting, in accordance with embodiments described herein.
Figure 15:
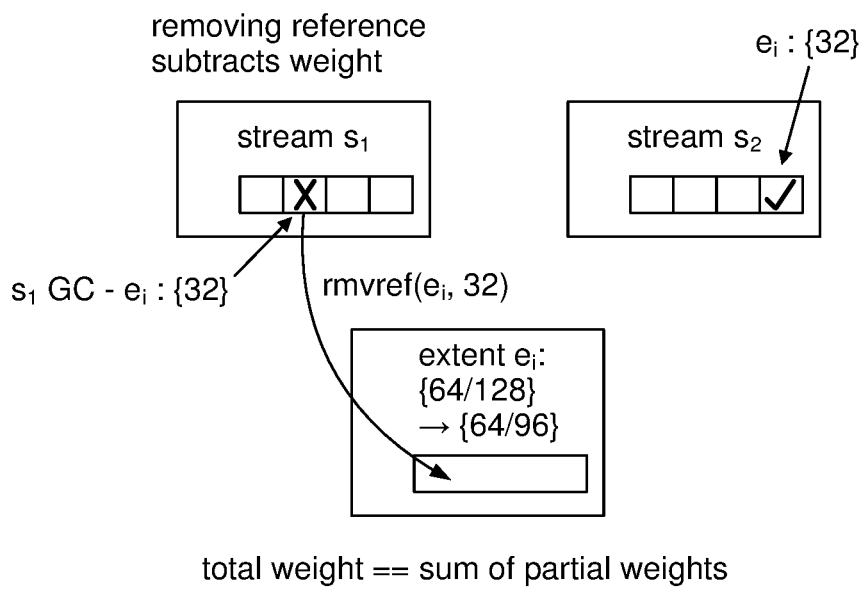
FIG. 15 is a schematic for implementing weighted reference counting, in accordance with embodiments described herein.

Embodiments described herein may be configured to implement weighted reference counting. In operation, upon extent creation, an extent manager assigns two weights to the extent: a partial weight and a total weight. By way of example, with reference to FIG. 12, let both weights be 128 initially, in FIG. 13, when the extent is referenced by a stream manager, the partial weight is evenly split between the extent manager and the stream manager, each getting a partial weight of 64. In FIG. 14, when the stream manager splits into two, the partial weight is again evenly split between the two new stream managers, each getting a partial weight of 32. In FIG. 15, when one stream manager removes its reference, it subtracts its partial weight from the total weight at the extent manager, which now becomes 128−32=96. When the other stream manager also removes its reference and subtracts its partial weight, the total weight drops to 64. The partial weight and total weight at the extent manager are now both 64 and equal. This implies there exist no outstanding reference and the extent can be safely reclaimed. Weighted reference counting can greatly simplify stream manager split, which no longer requires updating reference counts at the extent manager.

Figure 16A:
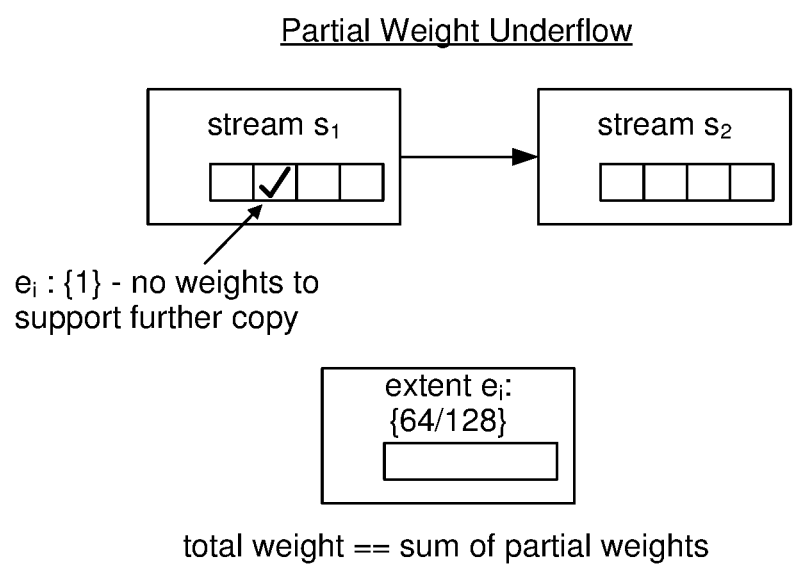
FIGS. 16A and 16B are schematics for implementing weighted reference counting, in accordance with embodiments described herein.

Weighted reference counting, however, introduces new challenges. In FIG. 16, when partial weight drops to 1, it can no longer be split. This issue is identified as weight underflow. One possible solution to deal with weight underflow is to atomically increase the partial weight at the stream manager and the total weight at the extent manager by the same amount (e.g., increasing both weights by 32). This atomicity requirement turns out to be same as extent deletion where the partial weight at the stream manager is atomically subtracted from the total weight at the extent manager. Atomic weight operations need to be resilient to message loss, duplication and out-of-order delivery. It could be implemented as distributed transaction which however comes with non-trivial overhead in terms of locking and recovery. Instead, distributed storage system 200 achieves atomicity by making all weight operations idempotent.

Figure 16B:
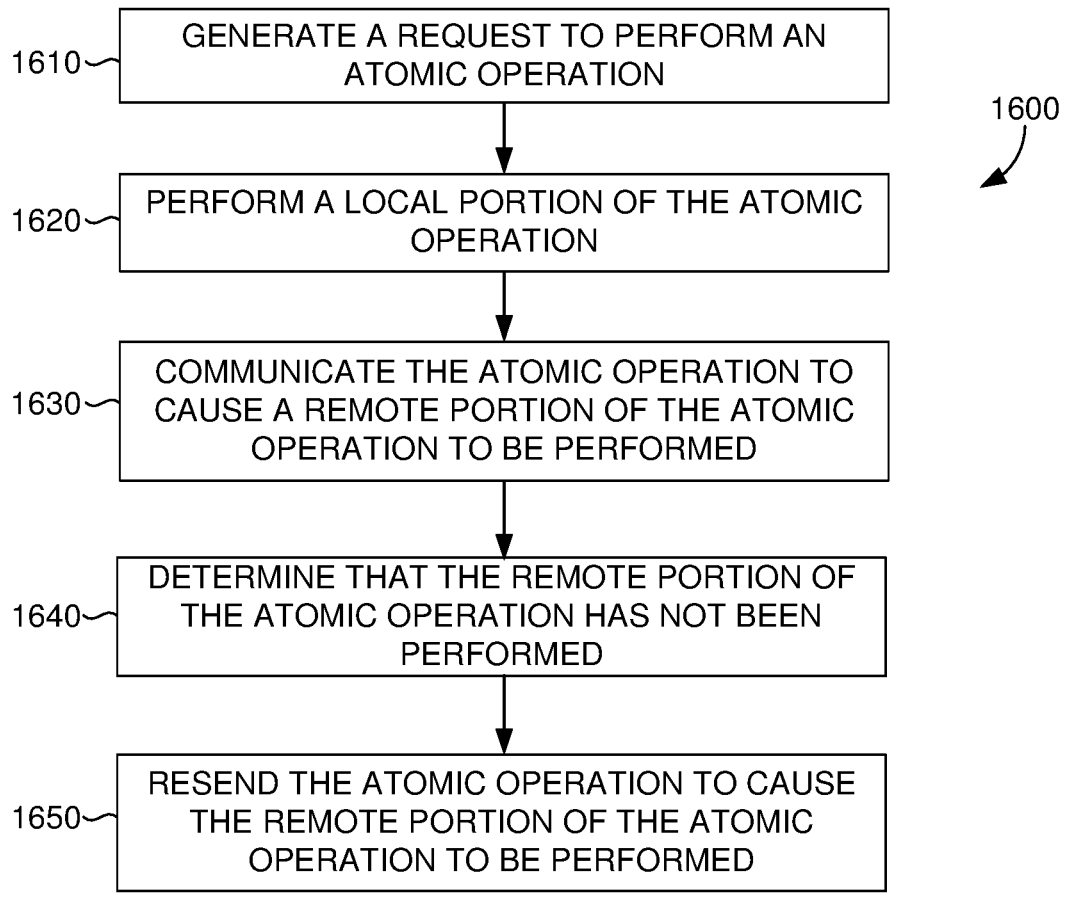

With reference to FIG. 16B, a flow diagram that illustrates an exemplary method 1600 for a computer-implemented method for garbage collection in a distributed storage system based on atomically increasing the weights, is provided. In particular, partial weights can be increased at stream managers and total weights increased at extent managers. Atomic weight operations achieve idemptotency in that the operations will produce the same results if executed once or multiple times. Initially at block 1610, generate a request to perform an atomic operation. The atomic operation is associated with a unique identifier to make the atomic operation idempotent. The atomic operation can be defined with a local portion and a remote portion of the atomic operation, where the local portion is executed on one component (e.g., stream manager) and the remote portion is executed on another component (e.g., extent manager). The atomic operation may be to increase partial weights at stream managers and total weights at extent managers. The atomic operation can specifically preclude locking both stream manager and extent manager in order to perform the atomic operation. Conventional atomic operations include locking objects and do not provide for parallelism and recovery requirements. The atomic operations implemented in embodiments herein are configured to be idempotent without locking.

At block 1620, a local portion of the atomic operation is performed. At block 1630, the atomic operation is communicated to cause a remote portion of the atomic operation to be performed. In one example, the atomic operation can include the local portion to cause a change to a partial weight associated with a stream manager, which is implemented as a local write that is applied, stored and communicated to an extent manager. The extent manager can receive the atomic operation and can then perform the remote portion of the atomic operation which can include a change to the total weight associated with the extent manager.

At block 1640, determining that the remote portion of atomic operation has not been performed. By way of example, the extent manager, if successful at performing the remote portion of the atomic operation, sends an acknowledgement that the remote portion of the atomic operation has been performed. In this regard, atomic weight operations are resilient to message loss, duplication and out-of-order delivery based in part on the unique identifier and the acknowledgment or lack of acknowledge message for the atomic operation. In particular, if the positive acknowledgement is not received, the atomic operation is resent to the extent manager and repeated until a positive acknowledgement is received. Because each atomic operation includes a unique identifier the operations are idempotent as the operation can be repeated or retried as often as necessary without causing unintended effects. As such, at block 1650, the atomic operation is resent to cause the remote portion of the atomic operation to be performed.

Figure 17:
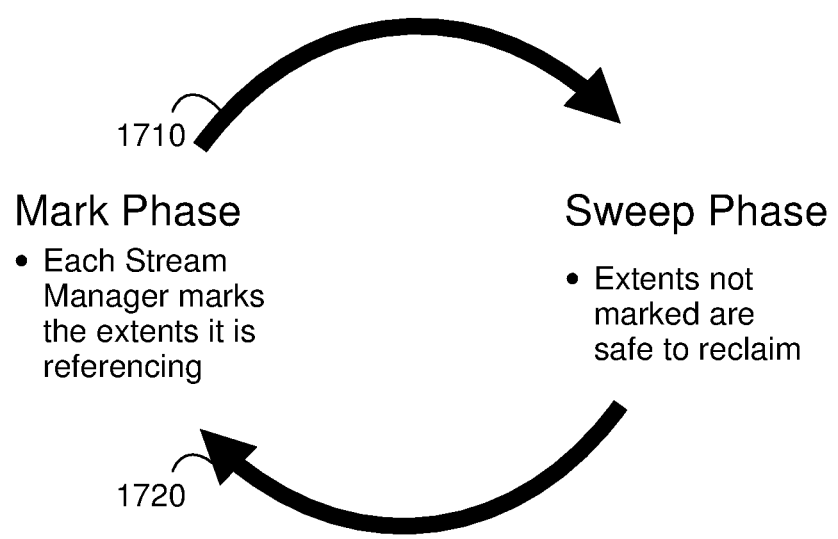
FIG. 17 is a schematic for implementing mark-and-sweep, in accordance with embodiments described herein.
Figure 18:
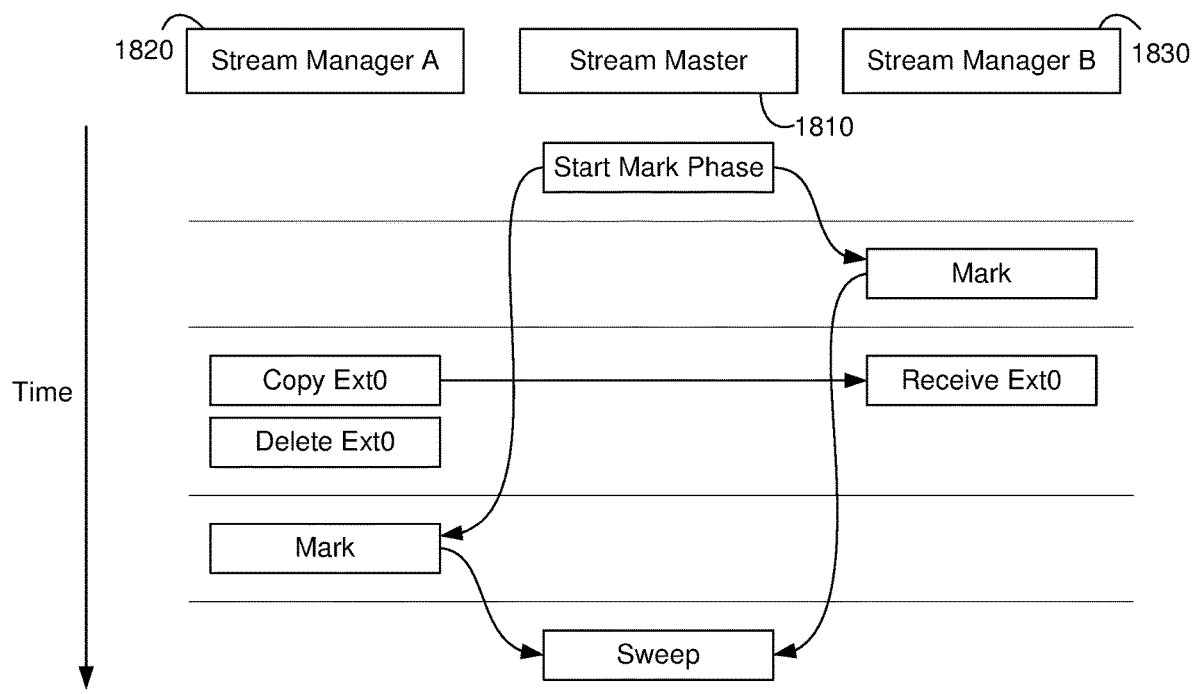
FIG. 18 is a schematic for implementing modified mark-and-sweep, in accordance with embodiments described herein.

Embodiments provided herein may also be configured to operate using a mark-and-sweep approach for distributed garbage collection. As shown in FIG. 17, the mark-and-sweep approach consists of two phases: a mark phase 1710 and a sweep phase 1720. In the mark phase, each stream manager independently marks all the extents the stream manager is referencing. Once all stream managers complete their mark phase, the sweep phase begins. Any extent which has not been marked is identified as not being referenced and thus safe to reclaim. While conceptually simple, special attention is required to ensure the correctness of this approach. By way of example, with reference to FIG. 18, consider the following scenario. A stream master 1810 can initiates a mark phase. Stream manager A 1810 first copies an extent to stream manager B 1820 and then deletes the extent from itself. Since each stream manager operates independently and marks their corresponding extents, the approach assumes the operations are executed in the following time order. Stream manager B 1820 completes its mark phase before it adds the extent, while stream manager A starts its mark phase after it deletes the extent. This execution order causes the extent to miss marking by both stream managers and results in it being reclaimed prematurely.

Figure 19:
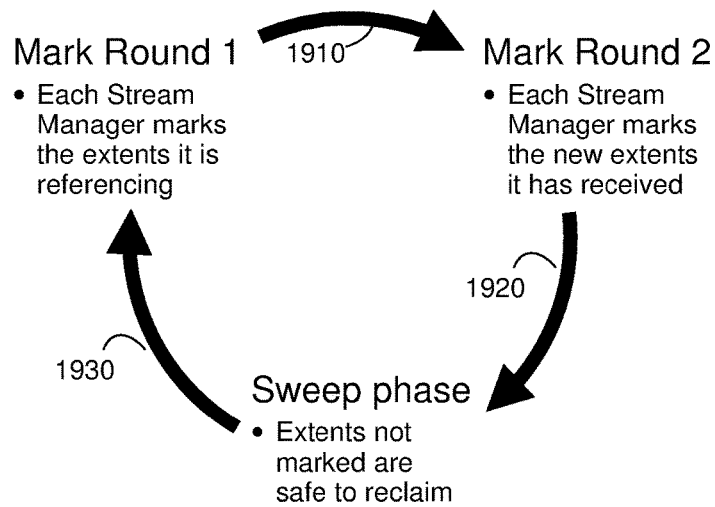
FIG. 19 is a schematic for implementing modified mark-and-sweep, in accordance with embodiments described herein.

As such, the mark-and-sweep approach is instead implemented as a modified mark-and-sweep approach as shown in FIG. 19. First, a global sequence engine is implemented. The global sequence engine is responsible for distributing monotonically increasing sequence numbers. The modified mark-and-sweep approach also implements a centralized authority, called stream master, which acts as the global sequence engine. Second, at the beginning of the mark phase (e.g., Mark Round 1), a stream manager first obtains a global sequence number. The stream manager then marks its corresponding extents with the sequence number. For a given extent, its marked sequence number can only increase, so marking with a smaller sequence number is ignored. Third, upon the completion of the mark phase, the stream manager reports to the stream master with the global sequence number. Fourth, after stream managers complete their mark phase, a global barrier is derived as the smallest global sequence number reported across all stream mangers. Finally, the stream manager records newly added extents and marks them before it completes the next round of the mark phase (e.g., Mark Round 2).

Figure 20:
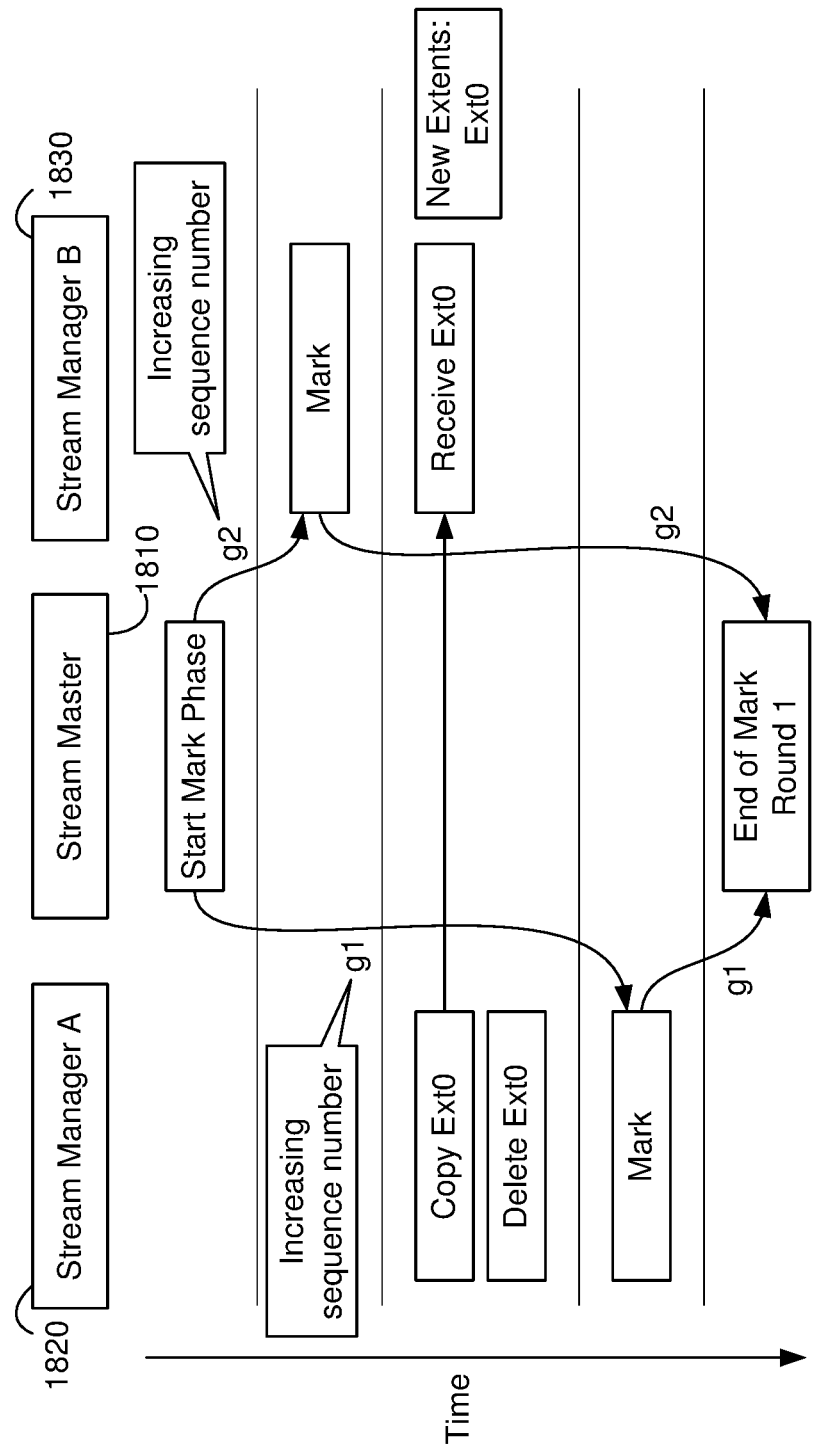
FIG. 20 is a schematic for implementing modified mark-and-sweep, in accordance with embodiments described herein.
Figure 21:
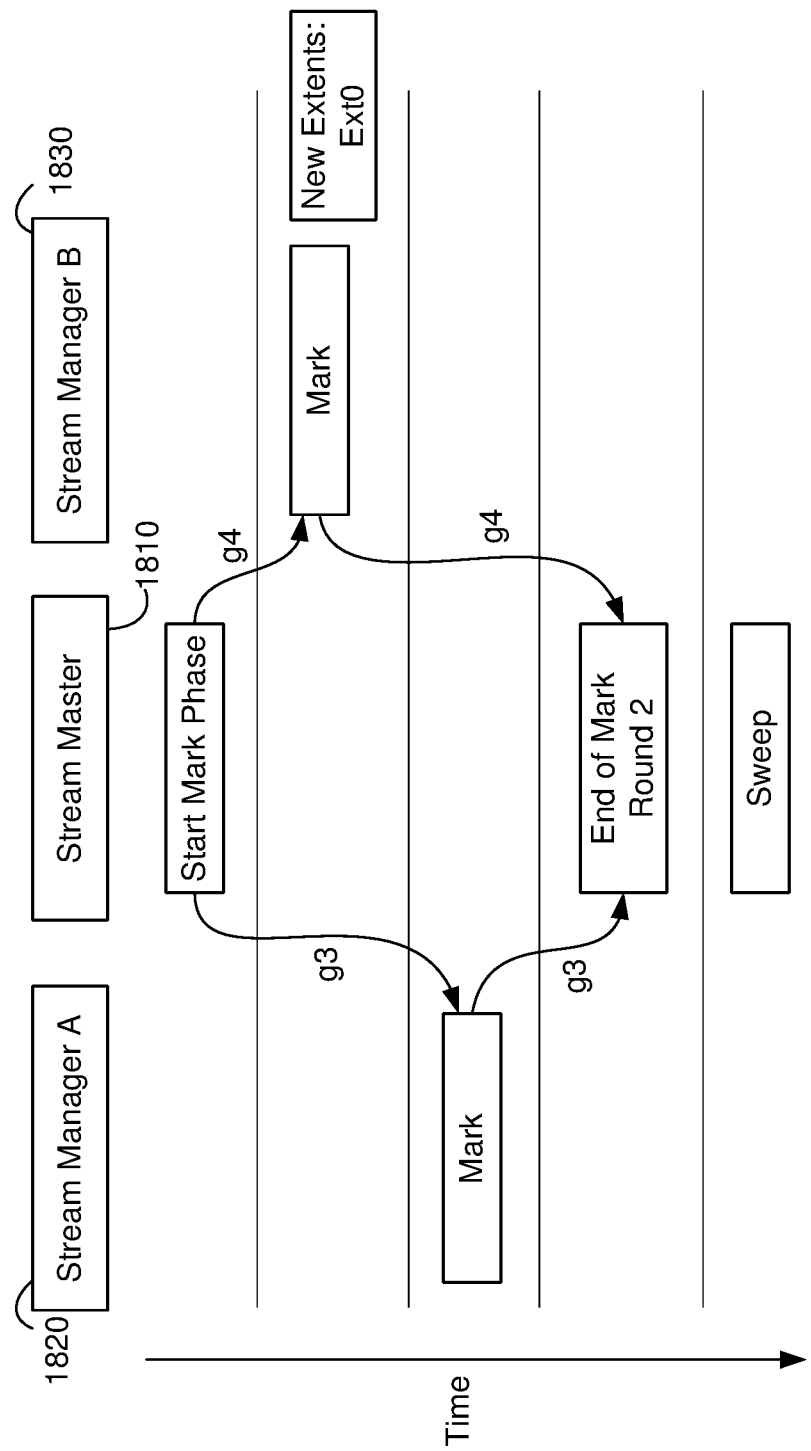
FIG. 21 is a schematic for implementing modified mark-and-sweep, in accordance with embodiments described herein.
Figure 22:
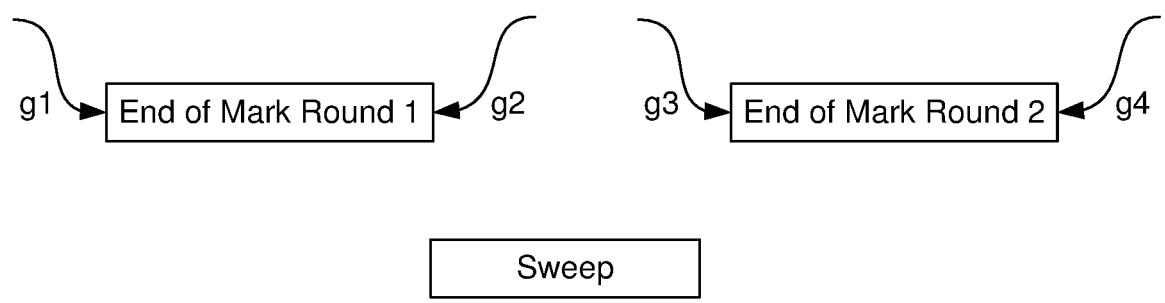
FIG. 22 is a schematic for implementing modified mark-and-sweep, in accordance with embodiments described herein.

With reference to the previous example, as shown in FIG. 20, stream manager B 1810 starts its mark phase with a global sequence number $g_0$, but misses the extent that is added after the mark phase. Stream manager A 1820 starts marking with $g_1$ and also misses the extent that is deleted before $g_1$. Fortunately, stream manager B 1830 records the extent, so it marks the extent with a new global sequence number $g_3$ in the next round of marking. Therefore, it is guaranteed that newly added extents could not miss more than one round of marking. As such, let the global barrier be $gb_0=g_0$ for the first round and $gb_1=g_2$ for the second round. In FIG. 21, after the completion of the second round, the sequence number of any extent with reference from the stream manager must be at least $gb_0$. In other words, all extents with smaller sequence numbers are no longer referenced by any stream manager and are safe to be reclaimed. In operation, as shown in FIG. 22, the smallest sequence number reported by any stream manager in any of the two mark phases can be calculated. Any extent marked with a smaller sequence number is safe to reclaim.

Figure 23:
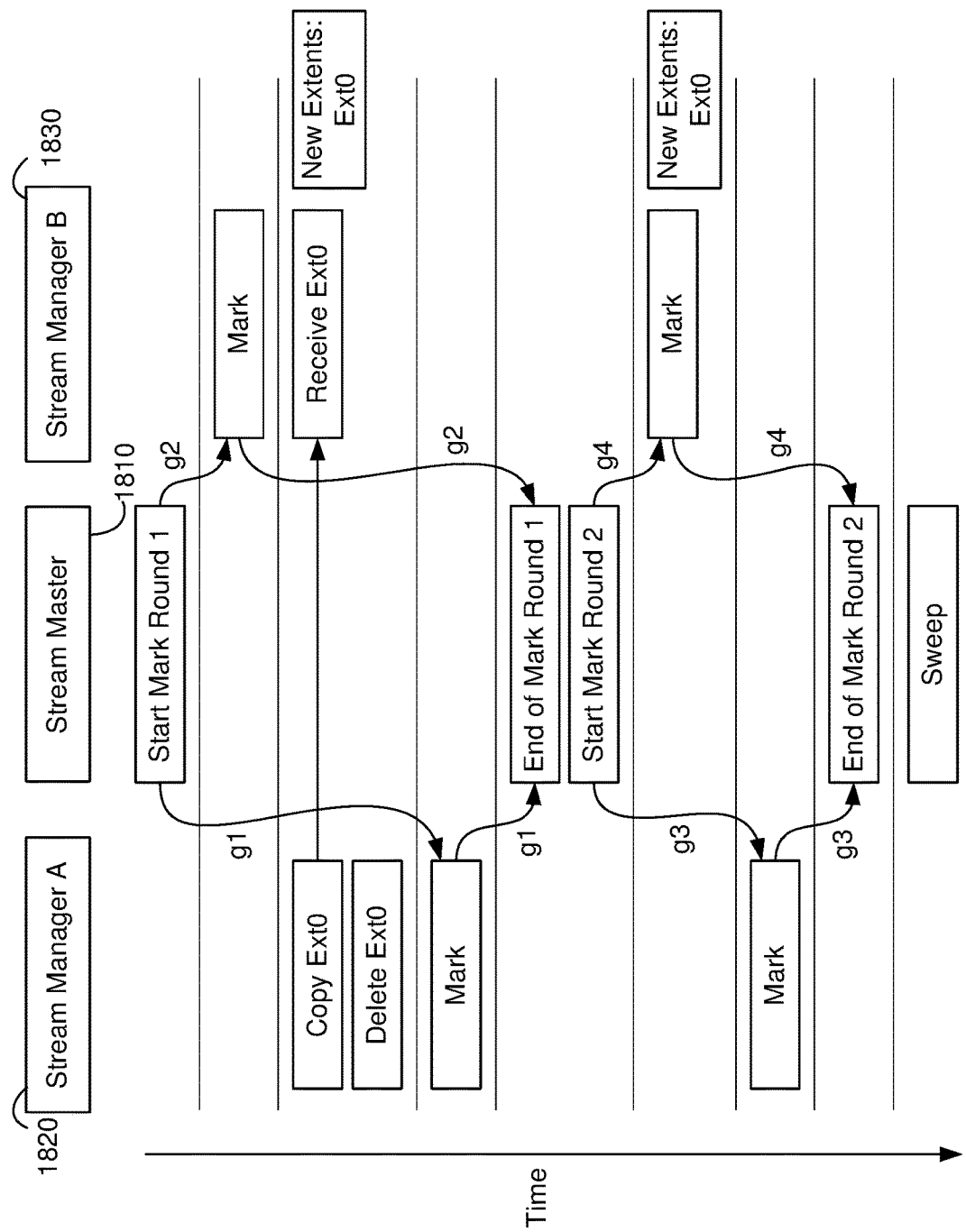
FIG. 23 is a schematic for implementing modified mark-and-sweep, in accordance with embodiments described herein.

As shown in FIG. 23, the mark-and-sweep approach simplifies stream manager split. The stream manager no longer requires keeping track of partial weights. In addition, the mark-and-sweep approach matches table partition local garbage collection logic, where table partition periodically scans its internal index to identify which extents are no longer being referenced. In this regard, embodiments of the present disclosure may be implemented to combine the mark phase in stream manager with the local garbage collection logic in table partition. On the other hand, mark-and-sweep can operate less efficiently than reference counting. Even when an extent is referenced by a single stream manager, it cannot be promptly reclaimed after the stream manager deletes the reference. Rather, stream manager has to wait for two rounds of marking completed by all stream managers. In comparison, the extent would have been reclaimed much quicker with reference counting.

Accordingly, embodiments of the present implementation operate to execute distributed garbage collection based on a hybrid approach comprising the combination of the mark-and-sweep with weighted reference counting. In this regard, some extents keep track of weights and are managed by weighted reference counting, while others are marked with global sequence numbers and managed by mark-and-sweep. Advantageously, the hybrid approach allows handing-off extents from reference counting to mark-and-sweep, but not vice versa. Extent hand-off may occur in two scenarios. The first scenario is when partial weight drops to a defined threshold (e.g., 1), as an indication of an extent becoming extensively shared among stream mangers, the extent is handed-off from reference counting to mark-and-sweep. Extent hand-off helps to avoid weight underflow, which would otherwise require atomic weight increase. Extent hand-off is also justified because the efficiency of weighted reference counting becomes less prominent when extents are extensively shared. The second scenario is when there are too many extents managed by weighted reference counting. Since stream manager split requires splitting partial weights, it is preferable not to maintain too many partial weights. The stream manager can operate to hand-off extents from weighted reference counting to mark-and-sweep whenever the amount of partial weights becomes excessive, as defined by another threshold.

In operation, the distributed storage system 200 manages both mark-and-sweep and weighted reference counting in a single system table, named extent lifetime table, in the bootstrap layer. Extent lifetime table can be indexed by extent ID and may contain two fields for each extent: mark sequence and reference weight. The mark sequence field is updated by stream manager during mark phase and records global sequence numbers. The reference weight field is updated by the extent manager upon extent creation and by the stream manager and upon extent deletion. When the stream manager hands off extents from weighted reference counting to mark-and-sweep, the stream manager simply modifies extent lifetime table by voiding the reference weight field and updating the mark sequence field with the latest global sequence number of the stream manager. In this way, extent with valid reference weight is managed by weighted reference counting and by mark-and-sweep otherwise.

Advantageously, extent hand-off avoids weight underflow in weighted reference counting. The remaining challenge is distributed transaction for weight subtraction upon extent deletion. Fortunately, this can be avoided as well. By way of example, assuming an initial weight of 128, no weight underflow guarantees that an extent will never be shared by more than 128 stream managers. This implies that the total number of weight subtractions occurred on the extent is bounded by 128. Therefore, instead of merely weights, extent lifetime table can afford to record the full history of all updates. Recording the full history makes update idempotent and distributed transaction is no longer needed.

Further, illustrating the extent lifetime management by way of example, consider when $e_3$ is created, its extent manager updates the reference weight field in extent lifetime table with {128/128} (for the partial and total weight). When $e_3$ is referenced, a stream manager updates the table with {$s_1$, p−64}, which means $s_1$ references the extent and subtracts the partial weight by 64. This update is recorded in addition to the previous one. Note that $s_1$ is kept in the field in order to ensure the update is idempotent. The stream manager can retry multiple times and still be certain the update is applied just once. The update history of $e_4$ tells a different story. The extent is first created and referenced by $s_1$. When $s_1$ splits, $e_4$ becomes shared by $s_1$ and $s_2$, each getting a partial weight of 32. Later, both $s_1$ and $s_2$ remove their reference to $e_4$. This results in two extent lifetime table updates: {$s_1$, t−32} and {$s_2$, t−32}, where t−32 means subtracting the total weight by 32. At this point, both the partial weight and total weight become 64 and are equal, so $e_4$ is safe to reclaim.

One concern about the global mark-and-sweep approach is that it marks all extents. It is wasteful to mark extents repeatedly that are not being deleted. In addition, the amount of marking traffic grows with the number of extents in the storage cluster. An optimization to reduce marking traffic can be based on a deletion candidate list. The distributed storage system can compile a deletion candidate list and instruct stream managers to mark only extents in the list. Since the deletion candidate list is much shorter than the full extent list, this significantly reduces unnecessary marking traffic. In operation, a local deletion candidate collection can be implemented at the stream manager. Extent deletion can be explicit, where a Table Partition invokes the stream manager whenever it deletes an extent. An extent deleted by Table Partition locally is added to the local deletion candidate collection. Additionally, a prepare phase in mark-and-sweep can be implemented. During the prepare phase, the stream master pulls all stream managers and aggregates their local deletion candidate collections into a global deletion candidate list. Note that there is no requirement for the prepare phase to be comprehensive. It is perfectly fine if some extent managers miss the prepare phase.

During the mark phase, the stream master can first broadcasts the global deletion candidate list to all stream managers. Each stream manager then performs two rounds of marking. In round I, the stream manager submits the global deletion candidate list to the table partition. The table partition walks through its local index, checks encountered extents against the list and informs stream manager those still being referenced. The stream manager marks the extents locally and updates the extent lifetime table in batch. Upon the completion of round I, stream manager reports to the stream master. After receiving the completion reports from all stream managers, stream master signals the beginning of round II. In the meanwhile, stream manager tracks extents that have been newly added since the beginning of round I and keeps marking them. When all the extents added before the beginning of round II have been marked, stream manager reports the completion of round II to the stream master.

The sweep phase is similar as before. Upon the completion of the mark phase by all stream managers, the extents in the global deletion candidate list are examined. Those, whose global sequence numbers do not catch up, are identified as orphan extents and safe to reclaim. Instead of being deleted right away, these extents are added to a global confirmed deletion list, which retains deleted extents for a certain period and serves as a global trash can.

Extent quarantine is another optimization to further reduce marking traffic and accelerate reclaiming extent.

Extent sharing is introduced by blob copy and partition split. If these operations can be confined to a small group of stream managers, both broadcasting deletion candidate list and marking extent can be quarantined to these stream managers. Extent quarantine is enabled by partition manager through exploiting higher level service semantics (such as blob copy can only occur within certain storage accounts) and exposed to the stream master.

Private extent is introduced to further simplify weighted reference counting. The types of extent are limited to two: private and shared. Private extent is referenced by a single stream manager, while shared extent is referenced by two or more. Private extent can be converted to shared, but not vice versa. The stream manager maintains a private extent collection. Newly created extents are always private and added to the private extent collection. When a private extent becomes shared, due to either blob copy or stream manager split, it is removed from the private extent collection and becomes shared.

Figure 24:
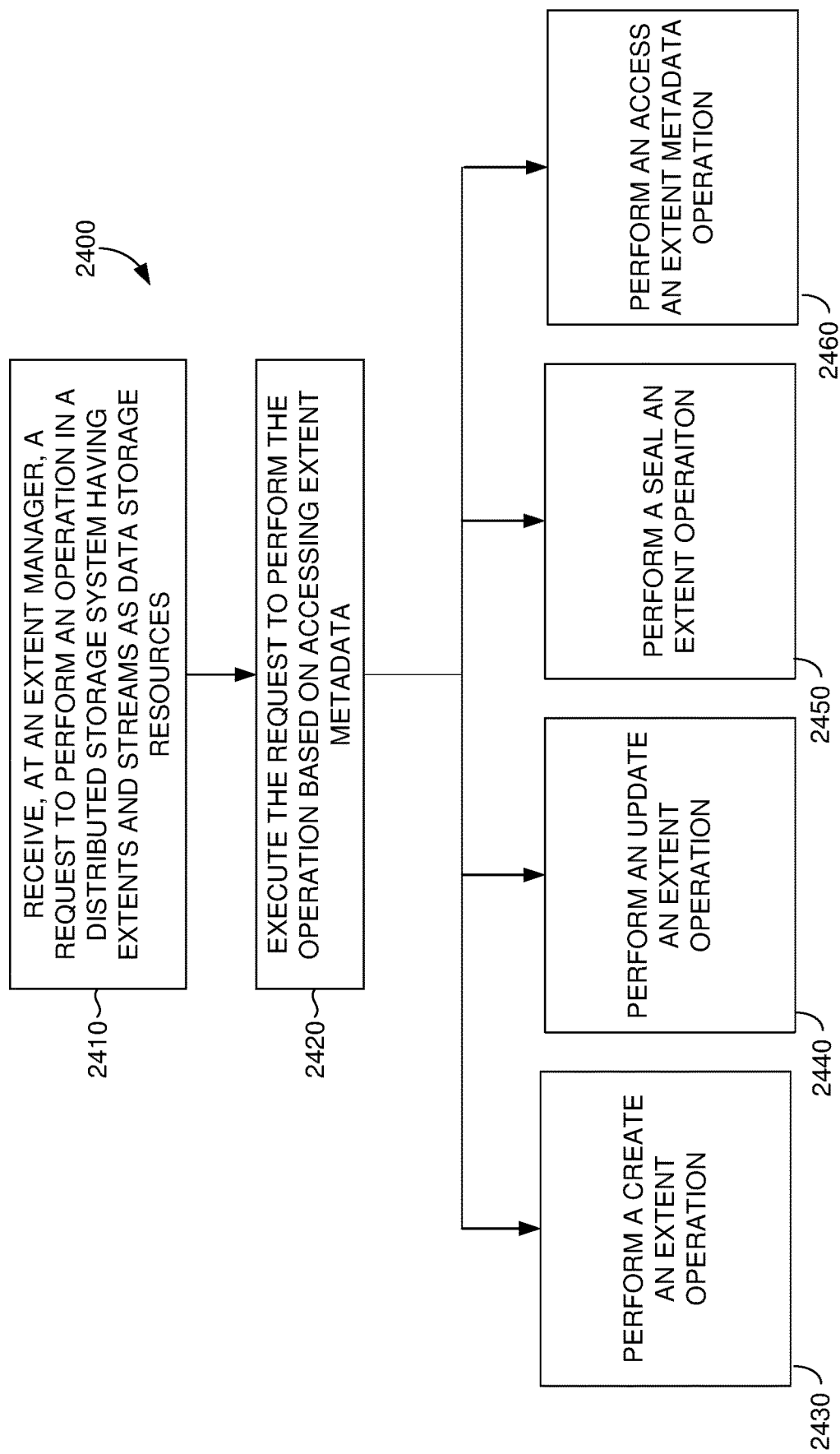
FIG. 24 is a flow chart showing an exemplary method for implementing distributed metadata management in distributed storage systems, in accordance with embodiments described herein.

With reference to FIG. 24 a flow diagram that illustrates an exemplary method 2400 for implementing distributed metadata management in a distributed storage system is provided. Initially at block 2410, a request to perform an operation in a distributed storage system is received at an extent manager. The distributed storage system has extents and streams as data storage resources. The extent manager is associated with an extent table that stores extent metadata of extents. The extent table supports management of extent metadata based on a plurality of extent managers. The extent metadata is managed independently of stream metadata of the streams, where the stream metadata is managed based on a plurality of stream managers.

At block 2420, the request to perform the operation is performed based at least in part on accessing extent metadata. The operations can include one of the following: a create an extent operation (e.g., block 2430) an update an extent operation (e.g., block 2440), a seal an extent operation (e.g., block 2450) and an access an extent metadata operation (e.g., block 2460).

At block 2430, a create an extent operation is performed. The create an extent operation is performed based on communicating a message to have an extent created on at least one extent node; receiving an acknowledgement from the at least one extent node that the extent has been created; and causing the generation of an entry for the extent in the extent table, the entry comprising extent metadata for the extent.

At block 2440, an update an extent operation is performed. The update an extent operation is performed based on the extent manager monitoring a plurality of extent nodes associated with extents in the distributed storage system; and synchronizing the extent metadata in the extent table based on monitored information from the plurality of extent nodes.

At block 2450, a seal an extent operation is performed. The extent seal operation comprises failure sealing of an extent based on receiving an indication of a seal length for an extent in at least two or more extent nodes; and updating a length and a seal flag of the extent metadata of the extent in the extent table.

At block 2460, an access extent metadata operation is performed. The access metadata operation comprises providing access to extent metadata stored in-memory at the extent manager, the extent manager is identified as storing the extent metadata based on a mapping between extent metadata identifiers and the plurality of extent managers.

Figure 25:
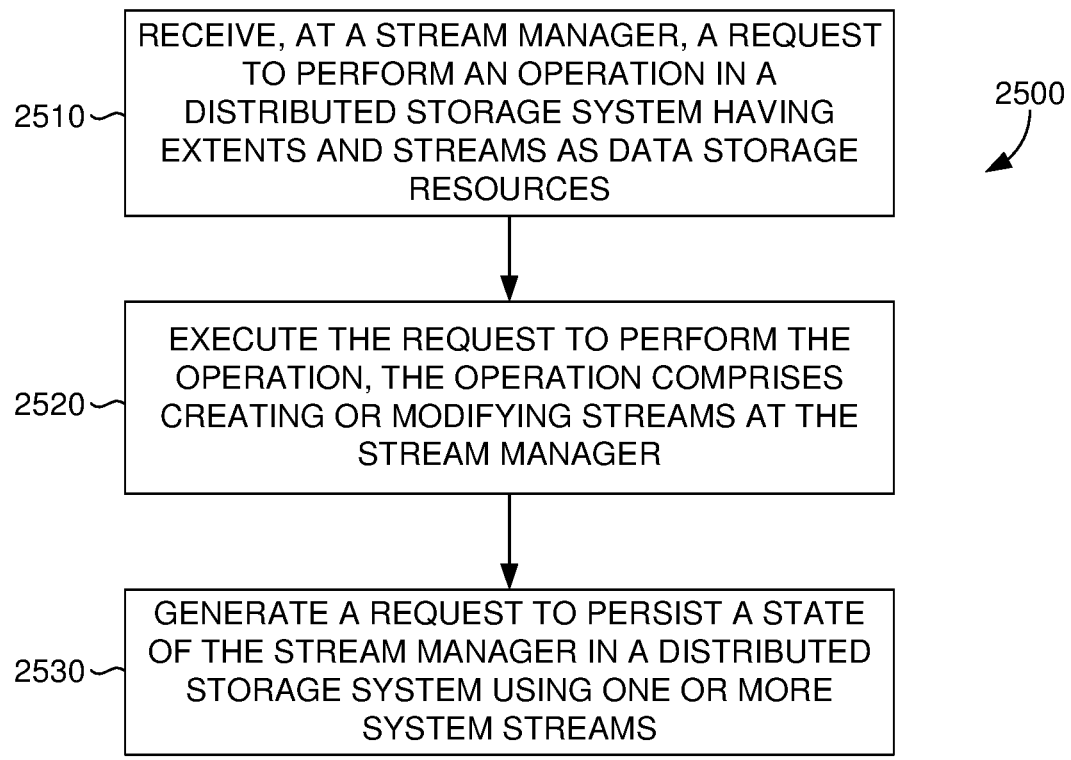
FIG. 25 is a flow chart showing an exemplary method for implementing distributed metadata management in distributed storage systems, in accordance with embodiments described herein.

With reference to FIG. 25 a flow diagram that illustrates an exemplary method 2500 for implementing distributed metadata management in a distributed storage system is provided. Initially at block 2510, a request to perform an operation in a distributed storage system having extents and streams as data storage resources, is received at a stream manager. The stream manager is associated with streams that store a list of extents. The stream metadata of the streams is managed based on a plurality of stream managers, the stream metadata is managed independently of extent metadata, the extent metadata managed based on a plurality of extent managers. The stream manager supports streams based on a stream object and a collection object, the stream object is an ordered list of extents and a collection object is an unordered list of extents.

At block 2520, the request to perform the operation is executed, where the operation comprises creating or modifying streams at the stream manager. At block 2530, a request to persist a state of the stream manager in a distributed storage system using one or more system streams is generated. The system streams include a command log stream and a checkpoint stream. The command log streams logs update command at the stream manager and the checkpoint stream takes snapshots of the stream manager to obviate replaying an entire history of command logs, where update commands are first recorded in the command log stream and then executed to modify an in-memory state of the stream manager.

Figure 26:
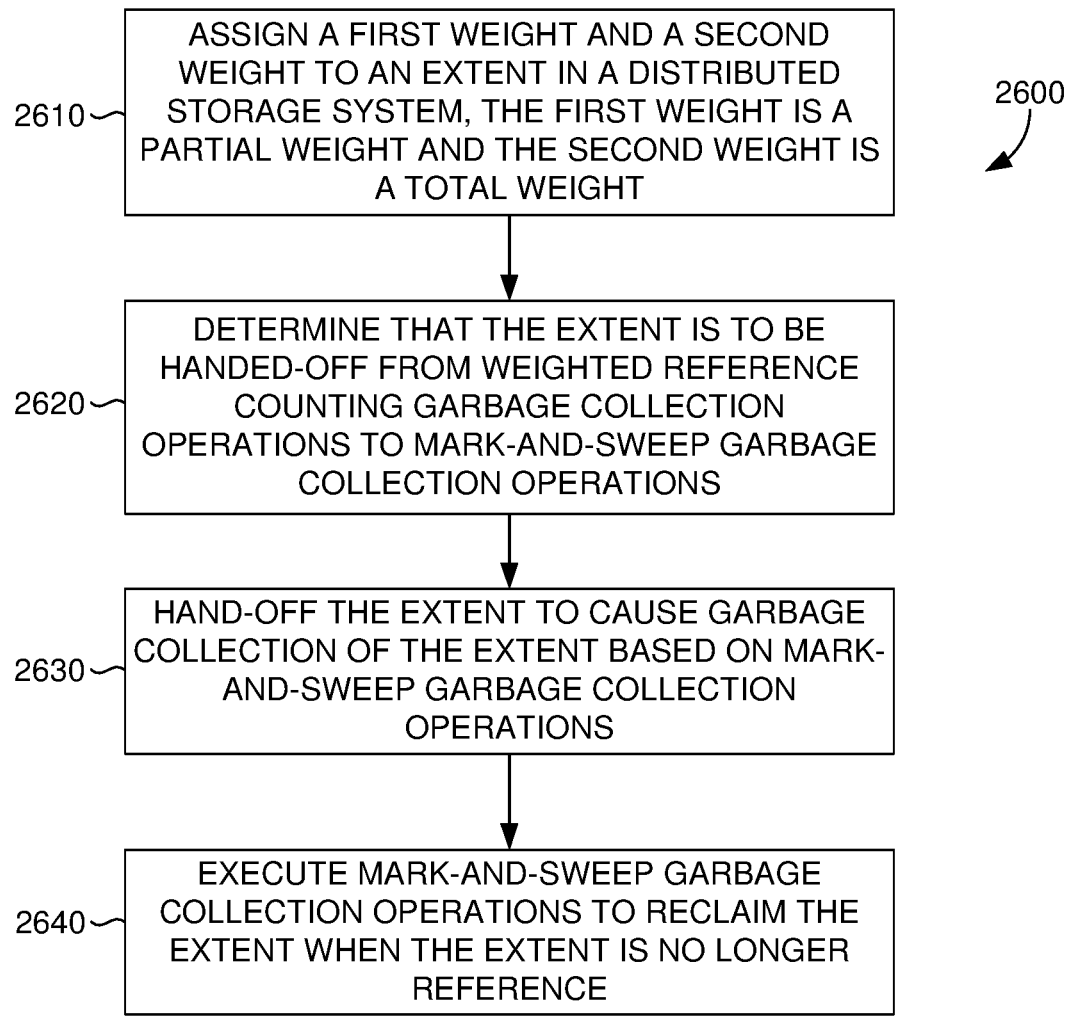
FIG. 26 is a flow chart showing an exemplary method for implementing hybrid garbage collection in distributed storage systems, in accordance with embodiments described herein.

With reference to FIG. 26, a flow diagram that illustrates an exemplary method 2600 for implementing distributed metadata management in a distributed storage system is provided. Initially at block 2610, a first weight and a second weight are assigned to an extent in a distributed storage system. The first weight is a partial weight and the second weight is a total weight, the extent is a data storage resource associated with weighted reference counting garbage collection operations based on the partial weight and the total weight. The first weight and the second weight are assigned using an extent manager upon creation of the extent in the distributed storage system.

The extent manager is further configured to split the partial weight between a stream manager and the extent manager, when a reference to the extent at the extent manager is generated at the stream manager. The extent manager splits the corresponding partial weight between a first stream manager and a second stream manager generated from splitting the stream manager. The extent manager subtracts the corresponding partial weight of the stream manager from a corresponding total weight at the extent manager when the stream manager removes a references to the extent. After at least one split of the partial weight between the extent manager and a stream manager, the extent manager can determine that the partial weight and the total weight at the extent manager are equal to cause reclaiming of the extent.

At block 2620, a determination that the extent is to be handed-off from weighted reference counting garbage collection operations to mark-and-sweep garbage collection operations is made. Determining that the extent is to be handed-off from weighted reference counting garbage collection operations to mark-and-sweep garbage collection operations, is based on, the partial weight dropping to meet a partial weight threshold, wherein the partial weight threshold indicates that an extent is becoming extensively shared among stream manager. Determining that the extent is to be handed-off from weighted reference counting garbage collection operations to mark-and-sweep garbage collection operations can also be based on a total number of extents utilizing weighted reference counting garbage collection operations reaching an extent threshold, the extent threshold indicates an upper limit of extents to be managed based on reference count garbage collection operations.

At block 2630, the extent is handed-off to cause garbage collection of the extent based on mark-and-sweep garbage collection operations. At block 2640, mark-and-sweep garbage collection operations are executed to reclaim the extent when the extent is no longer reference. Mark-and-sweep garbage collection operations include tracking a global sequence number associated with the mark-and-sweep garbage collection operations; marking extents corresponding to stream managers using the global sequence number; determining a global sequence number barrier based on a smallest global sequence number from the stream managers; marking extents corresponding to the stream managers using the global sequence number, where marking extents identifies newly added extents; and sweeping to reclaim one or more extents that are not marked by the stream managers.

Figure 27:
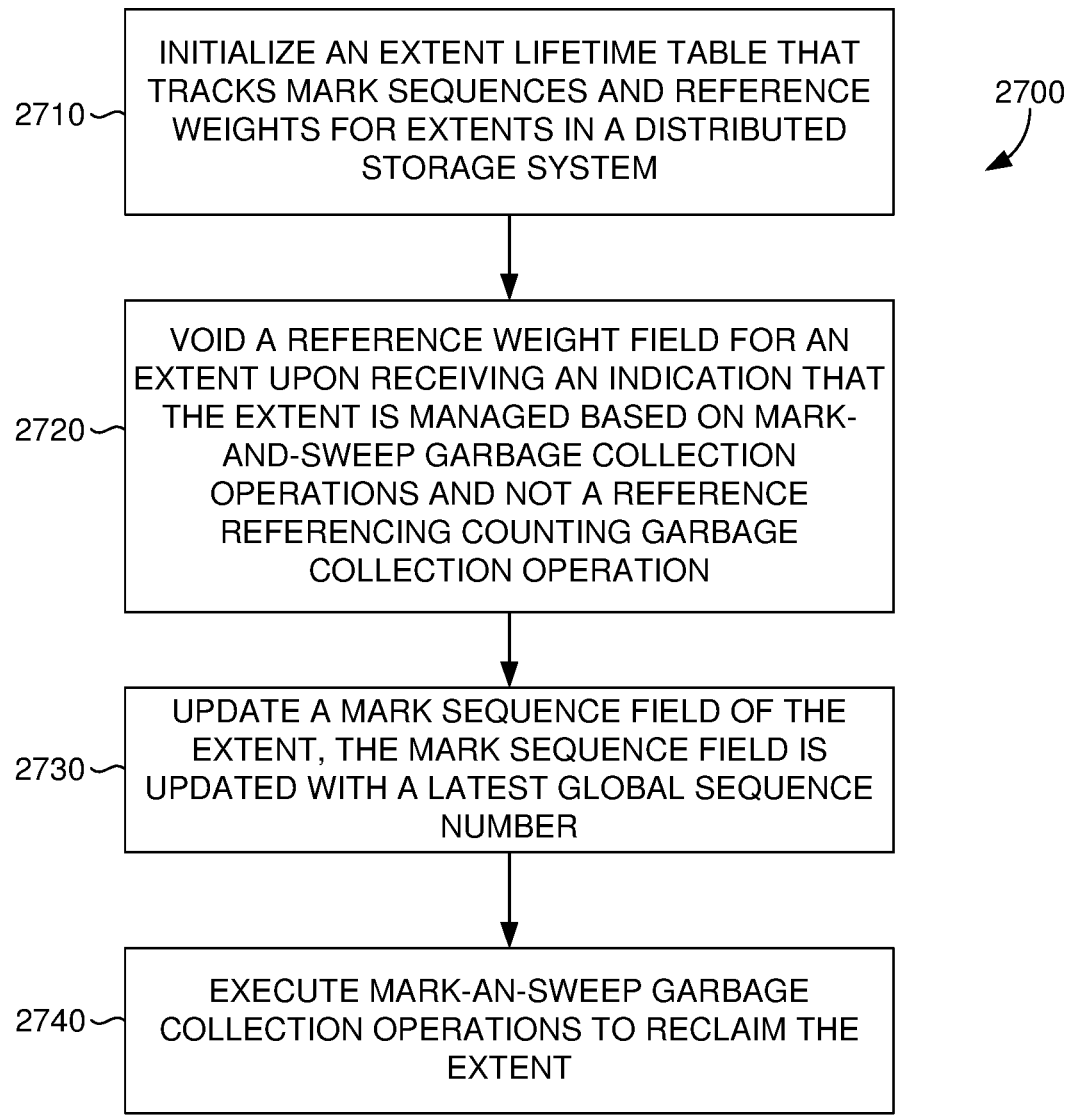
FIG. 27 is a flow chart showing an exemplary method for implementing hybrid garbage collection in distributed storage systems, in accordance with embodiments described herein.

With reference to FIG. 27 a flow diagram that illustrates an exemplary method 2700 for implementing distributed metadata management in a distributed storage system is provided. Initially at block 2710, an extent lifetime table that tracks mark sequences and reference weights for extents in a distributed storage system is initialized. The mark sequences and reference weights for extents in the extent lifetime table are updated based on indications from stream managers and extent managers respectively. The extent lifetime table indexes extents, based on an extent identifier, and the extent lifetime table also contains two fields for each extent, the mark sequence field and the reference weight field. The extent lifetime table is stored as a system table in a bootstrap layer of the distributed storage system, wherein the bootstrap layer leverages components of a legacy distributed storage system to facilitate distributed management of extent metadata and stream metadata based on the system table, system extents and systems streams and hybrid garbage collection based on the system table.

At block 2720, a reference weight field for an extent is voided upon receiving an indication that the extent is managed based on mark-and-sweep garbage collection operations and not a reference counting garbage collection operation. At block 2730, a mark sequence field of the extent is updated. The mark sequence field is updated with a latest global sequence number. At block 2740, mark-an-sweep garbage collection operations are executed to reclaim the extent.

Having described an overview of embodiments of the present disclosure, an exemplary operating environment in which embodiments of the present disclosure may be implemented is described below in order to provide a general context for various aspects of the present invention. By way of background, a distributed computing system or cloud computing system or platform can be implemented as a cloud computing platform that runs cloud services across different data center and geographic regions. The cloud computing platform can implement a fabric controller component for provisioning and managing resource allocation, deployment/upgrade, and management of cloud services. Typically, a cloud computing system acts to store data or run service applications in a distributed manner. The service-application components (e.g., tenant infrastructure or tenancy) of the cloud computing system may include nodes (e.g., computing devices, processing units, or blades in a server rack) that are allocated to run one or more portions of a tenant's service applications.

When more than one separate service application is being supported by the nodes, the nodes may be partitioned into virtual machines or physical machines that concurrently run the separate service applications, respectively, in individualized computing environments that support the resources and/or operating system specific to each service application. Further, each service application may be divided into functional portions such that each functional portion is able to run on a separate virtual machine. In cloud computing systems, multiple servers may be used to run service applications and perform data storage operations in a cluster. In particular, the servers may perform data operations independently but exposed as a single device referred to as a cluster. Each server in the cluster may be referred to as a node.

A storage service on the cloud computing system can be a service supported using the fabric controller component. The storage service can be responsible for managing the replication and data placement across disks and load balancing the data and the application traffic with storage clusters. The storage service can be responsible for managing access to a high volume of storage. The storage service can implement a storage stamp as a cluster of N racks of storage nodes and a location service that manages the storage stamps. Specifically the location service can allocate location stamps and manage them across the storage stamps for disaster recovery and load balancing. Accordingly, the distributed storage system, distributed computing system, and cloud computing system or platform are used interchangeably herein, unless otherwise noted.

Figure 28:
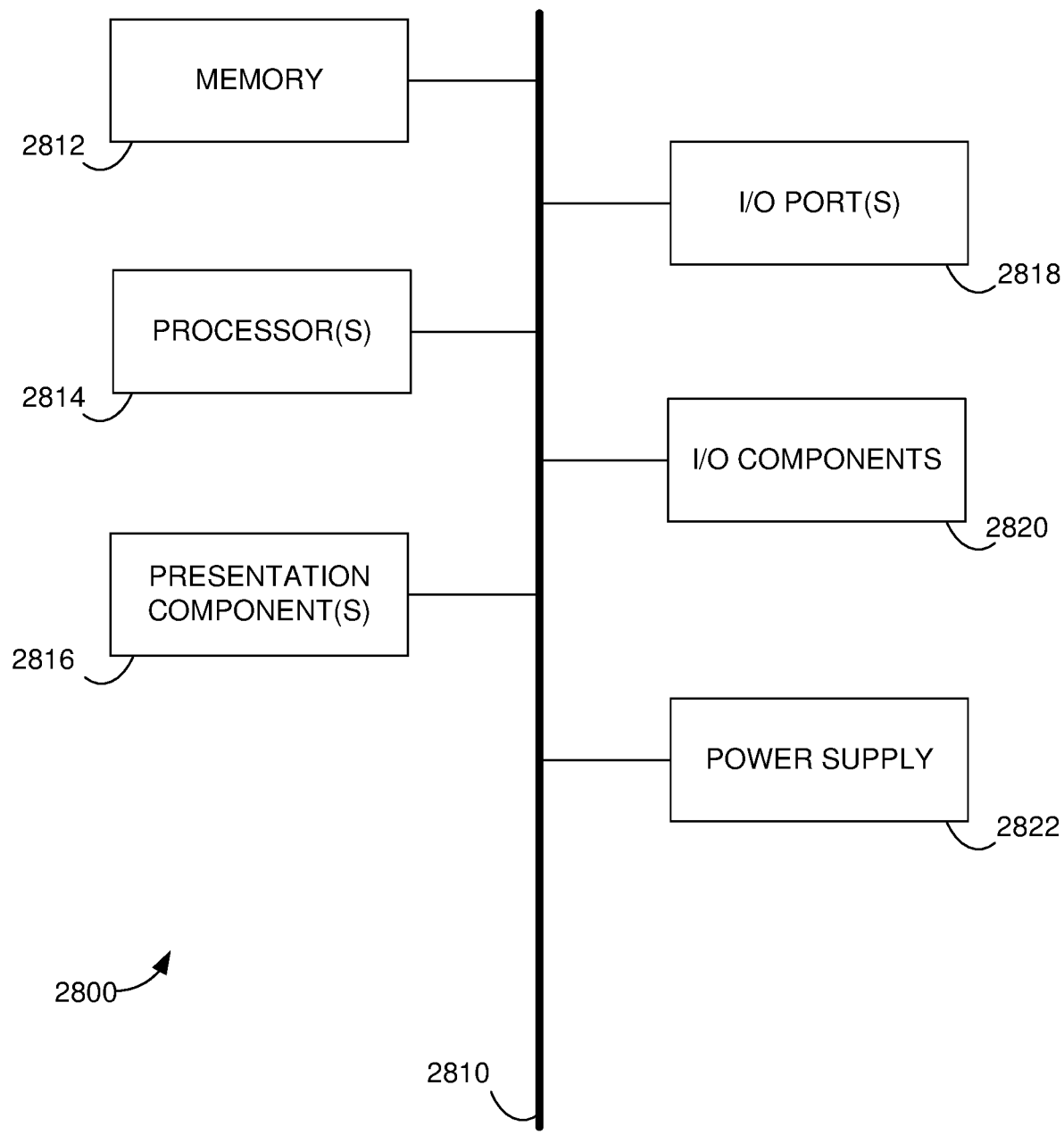
FIG. 28 is a block diagram of an exemplary computing environment suitable for use in implementing embodiments described herein.

Referring to FIG. 28 in particular, an exemplary operating environment for implementing embodiments of the present invention is shown and designated generally as computing device 2800. Computing device 2800 is but one example of a suitable computing environment and is not intended to suggest any limitation as to the scope of use or functionality of the invention. Neither should the computing device 2800 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 28, computing device 2800 includes a bus 2810 that directly or indirectly couples the following devices: memory 2812, one or more processors 2814, one or more presentation components 2816, input/output ports 2818, input/output components 2820, and an illustrative power supply 2822. Bus 2810 represents what may be one or more busses (such as an address bus, data bus, or combination thereof). Although the various blocks of FIG. 28 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. We recognize that such is the nature of the art, and reiterate that the diagram of FIG. 28 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 2800 typically includes a variety of computer-readable media. Computer-readable media can be any available media that can be accessed by computing device 2800 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 2812 includes computer storage media in the form of volatile and/or nonvolatile memory. The memory may be removable, non-removable, or a combination thereof. Exemplary hardware devices include solid-state memory, hard drives, optical-disc drives, etc. Computing device 2800 includes one or more processors that read data from various entities such as memory 2812 or I/O components 2820. Presentation component(s) 2816 present data indications to a user or other device. Exemplary presentation components include a display device, speaker, printing component, vibrating component, etc.

I/O ports 2818 allow computing device 2800 to be logically coupled to other devices including I/O components 2820, some of which may be built in. Illustrative components include a microphone, joystick, game pad, satellite dish, scanner, printer, wireless device, etc.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed storage system; however the distributed storage system unit depicted herein is merely exemplary. Components can be configured for performing novel aspects of embodiments, where configured for comprises programmed to perform particular tasks or implement particular abstract data types using code. Further, while embodiments of the present invention may generally refer to the distributed storage system and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

The invention claimed is:

1. A computer-implemented method, the method comprising:
   receiving a request to create an extent in a distributed storage system;
   creating the extent in two or more entity nodes, wherein extents in the two or more entity nodes are real replica extents;
   assigning the extent to a shadow replica extent that is a virtually created extent associated with a shadow replica entity node;
   detecting a failure in a first entity node of the two or more entity nodes; and
   based on detecting the failure in the first entity node, initiating shadow replica failure sealing operations, wherein shadow replica failure sealing operations are based on real replica extents and shadow replica extents.

2. The method of claim 1, wherein the distributed storage system comprises extents and streams as data storage resources, and an extent manager that is associated with an extent table that stores extent metadata of extents, wherein the extent table supports management of extent metadata based on a plurality of extent managers, the extent metadata is managed independently of stream metadata of the streams, the stream metadata managed based on a plurality of stream managers.

3. The method of claim 1, wherein shadow replica failure sealing operations further comprise determining a seal length based on the two or more entity nodes and the shadow replica entity node executing a consensus protocol to reach an agreement on the seal length.

4. The method of claim 1, wherein the request is to perform a create extent operation, the create extent operation comprises:
communicating a message to have an extent created on at least one extent node;
receiving an acknowledgement from the at least one extent node that the extent has been created; and
causing the generation of an entry for the extent in an extent table, the entry comprising extent metadata for the extent.

5. The method of claim 4, wherein the entry for the extent in the extent table is not persisted when a second extent manager from the plurality extent managers that also received a request to create the extent has previously succeeded in creating the extent from the request and has fewer extents.

6. The method of claim 1, wherein the distributed storage system further supports state manager failure sealing operations, wherein the state manager failure sealing operations comprise:
polling two or more entity nodes to determine a seal length; and
communicating a length and a seal flag to a corresponding extent manager of the extent.

7. The method of claim 1, wherein the distributed storage system further supports normal sealing operations, wherein the normal sealing operations comprise:
writing a seal record for an extent based on a chain-replication protocol; and
communicating a length and a seal flag to a corresponding extent manager of the extent.

8. One or more computer storage media having computer-executable instructions embodied thereon that, when executed by a computing system having a processor and memory, cause the processor to:
receive a request to create an extent in a distributed storage system;
create the extent in two or more entity nodes, wherein extents in the two or more entity nodes are real replica extents;
assign the extent to a shadow replica extent that is a virtually created extent associated with a shadow replica entity node;
detect a failure in a first entity node of the two or more entity nodes; and
based on detecting the failure in the first entity node, initiate shadow replica failure sealing operations, wherein shadow replica failure sealing operations are based on real replica extents and shadow replica extents.

9. The media of claim 8, wherein the distributed storage system comprises extents and streams as data storage resources, and an extent manager that is associated with an extent table that stores extent metadata of extents, wherein the extent table supports management of extent metadata based on a plurality of extent managers, the extent metadata is managed independently of stream metadata of the streams, the stream metadata managed based on a plurality of stream managers.

10. The media of claim 8, wherein shadow replica failure sealing operations further comprise determining a seal length based on the two or more entity nodes and the shadow replica entity node executing a consensus protocol to reach an agreement on the seal length.

11. The media of claim 8, wherein the request is to perform a create extent operation, the create extent operation comprises:
communicating a message to have an extent created on at least one extent node;
receiving an acknowledgement from the at least one extent node that the extent has been created; and
causing the generation of an entry for the extent in an extent table, the entry comprising extent metadata for the extent.

12. The media of claim 11, wherein the entry for the extent in the extent table is not persisted when a second extent manager from the plurality extent managers that also received a request to create the extent has previously succeeded in creating the extent from the request and has fewer extents.

13. The media of claim 8, wherein the distributed storage system further supports state manager failure sealing operations, wherein the state manager failure sealing operations comprise:
polling two or more entity nodes to determine a seal length; and
communicating a length and a seal flag to a corresponding extent manager of the extent.

14. The media of claim 8, wherein the distributed storage system further supports normal sealing operations, wherein the normal sealing operations comprise:
writing a seal record for an extent based on a chain-replication protocol; and
communicating a length and a seal flag to a corresponding extent manager of the extent.

15. A computerized system comprising:
one or more computer processors; and
computer memory storing computer-useable instructions that, when used by the one or more computer processors, cause the one or more computer processors to perform operations comprising:
receiving a request to create an extent in a distributed storage system;
creating the extent in two or more entity nodes, wherein extents in the two or more entity nodes are real replica extents;
assigning the extent to a shadow replica extent that is a virtually created extent associated with a shadow replica entity node;
detecting a failure in a first entity node of the two or more entity nodes; and
based on detecting the failure in the first entity node, initiating shadow replica failure sealing operations, wherein shadow replica failure sealing operations are based on real replica extents and shadow replica extents.

16. The system of claim 15, wherein shadow replica failure sealing operations further comprise determining a seal length based on the two or more entity nodes and the shadow replica entity node executing a consensus protocol to reach an agreement on the seal length.

17. The system of claim 15, wherein the request is to perform a create extent operation, the create extent operation comprises:
communicating a message to have an extent created on at least one extent node;
receiving an acknowledgement from the at least one extent node that the extent has been created; and causing the generation of an entry for the extent in an extent table, the entry comprising extent metadata for the extent.

18. The system of claim 17, wherein the entry for the extent in the extent table is not persisted when a second extent manager from the plurality extent managers that also received a request to create the extent has previously succeeded in creating the extent from the request and has fewer extents.

19. The system of claim 15, wherein the distributed storage system further supports state manager failure sealing operations, wherein the state manager failure sealing operations comprise:

polling two or more entity nodes to determine a seal length; and communicating a length and a seal flag to a corresponding extent manager of the extent.

20. The system of claim 15, wherein the distributed storage system further supports normal sealing operations, wherein the normal sealing operations comprise:

writing a seal record for an extent based on a chain-replication protocol; and communicating a length and a seal flag to a corresponding extent manager of the extent.

\* \* \* \* \*